US010979119B2

(12) United States Patent
Bontu et al.

(10) Patent No.: US 10,979,119 B2
(45) Date of Patent: Apr. 13, 2021

(54) BEAMFORMING IN CELLULAR SYSTEMS USING THE SAME FEEDBACK INFORMATION FOR DIFFERENT PHYSICAL CHANNELS

(71) Applicant: Telefonaktiebolaget LM Ericsson (publ), Stockholm (SE)

(72) Inventors: Chandra Sekhar Bontu, Nepean (CA); Mats Åhlander, Täby (SE); Magnus Hurd, Stockholm (SE); Anders Johansson, Hässelby (SE); Hong Ren, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/970,979

(22) PCT Filed: Apr. 18, 2018

(86) PCT No.: PCT/IB2018/052687
§ 371 (c)(1),
(2) Date: Aug. 19, 2020

(87) PCT Pub. No.: WO2019/202366
PCT Pub. Date: Oct. 24, 2019

(65) Prior Publication Data
US 2020/0403673 A1    Dec. 24, 2020

(51) Int. Cl.
*H04B 7/06* (2006.01)
*H04L 25/02* (2006.01)
*H04B 7/0456* (2017.01)

(52) U.S. Cl.
CPC ......... *H04B 7/0617* (2013.01); *H04B 7/0456* (2013.01); *H04L 25/0204* (2013.01)

(58) Field of Classification Search
CPC .. H04B 7/0469; H04B 7/0456; H04B 7/0617; H04B 7/0639; H04L 25/0242; H04L 25/0204
See application file for complete search history.

(56) References Cited

U.S. PATENT DOCUMENTS

2007/0142089 A1*  6/2007  Roy .................... H04B 7/0854
                                                        455/562.1
2011/0110451 A1    5/2011  Tsai et al.
(Continued)

OTHER PUBLICATIONS

PCT International Search Report and Written Opinion dated Jan. 21, 2019 for International Application PCT/IB2018/052687, 12 pages.
(Continued)

*Primary Examiner* — Sung S Ahn
(74) *Attorney, Agent, or Firm* — Sage Patent Group

(57) ABSTRACT

Embodiments of a method in a base station for precoding a downlink transmission are disclosed. In some embodiments, the method comprises obtaining, for a time instant k, an estimate of a channel matrix for a wireless channel for a downlink from the base station to a wireless device and projecting the estimate of the channel matrix onto one or more sets of spatial orthonormal functions, thereby obtaining respective sets of coefficients. The method further comprises, for each set of spatial orthonormal functions, filtering the set of coefficients for the time instant k based on a filtering parameter that is specific to a downlink channel to be transmitted. The method further comprises generating beamforming weights using the filtered set of coefficients for at least one of the sets of spatial orthonormal functions, and precoding the downlink channel using the beamforming weights.

20 Claims, 17 Drawing Sheets

(56) References Cited

U.S. PATENT DOCUMENTS

2016/0119097 A1* 4/2016 Nam .................... H04B 7/0639
  370/329
2018/0375554 A1* 12/2018 Faxer .................... H04W 52/36

OTHER PUBLICATIONS

Zoltowski, M.D. et al., "Closed-Form 2D Angle Estimation with Rectangular Arrays in Element Space or Beamspace Via Unitary ESPRIT", IEEE Transactions on Signal Processing, vol. 44, No. 2, Feb. 1996, pp. 316-328.

* cited by examiner

BEAMFORMING IN CELLULAR SYSTEMS USING THE SAME FEEDBACK INFORMATION FOR DIFFERENT PHYSICAL CHANNELS

CROSS-REFERENCE TO RELATED APPLICATIONS

This application is a 35 U.S.C. § 371 national stage application for International Application No. PCT/IB2018/052687, entitled "BEAMFORMING IN CELLULAR SYSTEMS USING THE SAME FEEDBACK INFORMATION FOR DIFFERENT PHYSICAL CHANNELS", filed on Apr. 18, 2018, the disclosures and contents of which are hereby incorporated by reference in their entireties.

TECHNICAL FIELD

The present disclosure relates to beamforming in a cellular communications system.

BACKGROUND

In cellular systems such as Long Term Evolution (LTE), LTE-Advanced, and New Radio (NR), a User Equipment (UE) typically feeds back information regarding a preferred signal precoding matrix to a respective network node (e.g., enhanced or evolved Node B (eNB) in LTE and LTE-Advanced or NR base station (gNB)). The precoding matrix is used by the network node to transmit multiple information data streams and/or beamform the information data streams in a preferred spatial direction towards the UE. The precoding matrix is derived by the UE from an estimated downlink channel matrix, where the downlink channel matrix is derived by the UE using reference signals transmitted by the network node in a subframe or over multiple subframes.

Typically, the feedback is not specific to each downlink physical channel type such as a Physical Downlink Control Channel (PDCCH), Physical Downlink Shared Channel (PDSCH), Physical Broadcast Channel (PBCH), etc. The feedback is derived based on the estimated transmission channel matrix to achieve a specified performance. For example, the performance criterion can be a specified target Block Error Rate (BLER).

However, in a practical deployment, there are different requirements for different downlink physical channels. For example, PDCCH may be required to be less error prone than PDSCH. This requirement is very demanding when the downlink signal is beamformed or precoded to match the estimated downlink channel. The precoding/beamforming waveform should be modified such that the target performance criterion is satisfied for each physical downlink channel. In general, a physical downlink channel is characterized by the type or importance of the information that is transmitted to the UE on that physical downlink channel.

One straight-forward way to provide precoding/beamforming to satisfy different target performance criteria for different physical downlink channels is to obtain multiple feedbacks from the UE, one for each physical downlink channel. However, this would substantially increase the feedback overhead. For example, one way to beamform PDCCH transmissions is to request UE feedback specifically for PDCCH transmission, where this feedback is separate from feedback for physical downlink traffic channel (e.g., PDCCH) transmission. The feedback for PDCCH transmission can then be used to derive an appropriate precoder for PDCCH transmissions for each Radio Resource Control (RRC) connected UE. However, this solution involves additional computational complexity and a substantial increase in feedback overhead. Furthermore, the feedback delay may cause beamforming to lag, which in turn can result in unwanted loss of detection of the PDCCH at the UEs.

Therefore, there is a need for systems and methods for downlink precoding or beamforming that is able to satisfy different performance requirements for different physical downlink channels without a substantial increase in computational complexity and feedback overhead.

SUMMARY

Systems and methods are disclosed herein that enable beamforming of different physical downlink channels based on the same feedback from a wireless device. In some embodiments, a method in a base station for precoding a downlink transmission comprises obtaining, for a time instant k, an estimate of a channel matrix for a wireless channel for a downlink from the base station to a wireless device. The method further comprises projecting the estimate of the channel matrix for the time instant k onto one or more sets of spatial orthonormal functions, thereby obtaining, for each set of spatial orthonormal functions, a set of coefficients $\{\alpha_{i,j,p}$, for i=0, 1, . . . , N−1, j=0, 1, M−1, and p=0, . . . , P$\}$ that result from projecting the estimate of the channel matrix for the time instant k onto the set of spatial orthonormal functions. Here, M×N defines a number of subarrays in an antenna system of the base station arranged in N rows and M columns where each subarray consists of P polarizations. The method further comprises, for each set of spatial orthonormal functions, filtering the set of coefficients for the set of spatial orthonormal functions for the time instant k and one or more additional sets of coefficients for the set of spatial orthonormal functions based on a filtering parameter that is specific to a downlink channel to be transmitted on the downlink from the base station to the wireless device, thereby providing a respective filtered set of coefficients $\{\overline{\alpha}_{i,j,p}\}$ for the set of spatial orthonormal functions for the time instant k. The method further comprises generating beamforming weights for the downlink channel to be transmitted on the downlink from the base station to the wireless device using the filtered set of coefficients $\{\overline{\alpha}_{i,j,p}\}$ for the time instant k for at least one of the one or more sets of spatial orthonormal functions, and precoding the downlink channel using the beamforming weights. By filtering based on the filtering parameter that is specific to the downlink channel to be transmitted, the method enables different beamforming weights to be computed for different types of downlink physical channels based on the same channel estimate and thus the same feedback.

In some embodiments, filtering the set of coefficients for the set of spatial orthonormal functions for the time instant k comprises filtering the set of coefficients for the set of spatial orthonormal functions for the time instant k in the time domain, wherein the one or more additional sets of coefficients for the set of spatial orthonormal functions comprises one or more additional sets of coefficients for the set of spatial orthonormal functions for one or more previous time instants.

In some embodiments, the estimate of the channel matrix is an estimate of the channel matrix at the time instant k for one of two or more subbands of a downlink frequency band, and filtering the set of coefficients for the set of spatial orthonormal functions for the time instant k comprises filtering the set of coefficients for the set of spatial orthonormal functions for the time instant k in the time domain and the frequency domain. The one or more additional sets of coefficients for the set of spatial orthonormal functions comprises one or more additional sets of coefficients for the set of spatial orthonormal functions for one or more previous time instants for the one of the two or more subbands. The one or more additional sets of coefficients for the set of spatial orthonormal functions further comprises, for each of at least one additional subband of the two or more subbands, additional sets of coefficients for the set of spatial orthonormal functions for the additional subband for the time instant k and the one or more previous time instants.

In some embodiments, the method further comprises, for each set of spatial orthonormal functions, filtering the set of coefficients for the set of spatial orthonormal functions and the one or more additional sets of coefficients for the set of spatial orthonormal functions based on a second filtering parameter that is specific to a second downlink channel to be transmitted on the downlink from the base station to the wireless device, thereby providing a respective second filtered set of coefficients for the set of spatial orthonormal functions for the time instant k. The method further comprises generating second beamforming weights for the second downlink channel to be transmitted on the downlink from the base station to the wireless device using the second filtered set of coefficients $\{\overline{\alpha}_{i,j,p}\}$ for the time instant k for at least one of the one or more sets of spatial orthonormal functions, and precoding the second downlink channel using the second beamforming weights. Further, in some embodiments, the downlink channel is a data channel and the second downlink channel is a control channel. In some other embodiments, the downlink channel is a Physical Downlink Shared Channel (PDSCH) and the second downlink channel is a Physical Downlink Control Channel (PDCCH).

In some embodiments, projecting the estimate of the channel matrix onto the one or more sets of spatial orthonormal functions comprises projecting the estimate of the channel matrix onto a set of spatial orthonormal functions. Further, generating the beamforming weights for the downlink channel to be transmitted on the downlink from the base station to the wireless device comprises reconstructing a channel matrix for the wireless channel from the filtered set of coefficients $\{\overline{\alpha}_{i,j,p}\}$ for the set of spatial orthonormal functions and computing the beamforming weights for the downlink channel from the reconstructed channel matrix.

In some embodiments, projecting the estimate of the channel matrix onto the one or more sets of spatial orthonormal functions comprises projecting the estimate of the channel matrix onto two or more sets of spatial orthonormal functions. Further, generating the beamforming weights for the downlink channel to be transmitted on the downlink from the base station to the wireless device comprises selecting one of the two or more sets of spatial orthonormal functions based on the filtered sets of coefficients for the two or more sets of spatial orthonormal functions, selecting one of the spatial orthonormal functions from the selected set of spatial orthonormal functions based on the filtered set of coefficients for the selected set of spatial orthonormal functions, and computing the beamforming weights for the downlink channel based on the selected spatial orthonormal function. In some embodiments, different ones of the two or more sets of spatial orthonormal functions having different 3 decibel (dB) beamwidths and/or different angles of departure with respect to an antenna system of the base station.

In some embodiments, selecting one of the two or more sets of spatial orthonormal functions based on the filtered sets of coefficients for the two or more sets of spatial orthonormal functions comprises selecting one of the two or more sets of spatial orthonormal functions that is determined, based on the respective filtered set of coefficients, to satisfy one or more conditions. The one or more conditions comprising at least one of the following conditions: a condition where a number of orthonormal functions or beams within the one set defined by the filtered set of coefficients that contains useful information is less than a predefined threshold number of beams; a condition where a signal to leakage ratio is greater than a predefined threshold signal to leakage ratio, where the signal to leakage ratio is defined as a ratio of the useful signal power captured by the coefficients of the one set of orthonormal functions to the signal power that is not captured by the coefficients of the one set of orthonormal functions; and a condition that a maximum radiated power in the orthonormal functions or beams other than one or more orthonormal functions or beams that contain useful information is less than a predefined threshold radiated power.

In some embodiments, selecting one of the spatial orthonormal functions from the selected set of spatial orthonormal functions based on the filtered set of coefficients for the selected sets of spatial orthonormal functions comprises selecting one of the spatial orthonormal functions from the selected set of spatial orthonormal functions having a largest value of $|\overline{\alpha}_{i,j,p}|^2$ within the selected set of spatial orthonormal functions.

In some embodiments, computing the beamforming weights for the downlink channel based on the selected spatial orthonormal function comprises scaling the selected spatial orthonormal function in the selected set of spatial orthonormal functions based on a scaling factor, the scaling factor being such that a total transmit power is within predefined limits of an allowed transmit power range for the base station.

In some embodiments, projecting the estimate of the channel matrix onto the one or more sets of spatial orthonormal functions comprises projecting the estimate of the channel matrix onto a set of spatial orthonormal functions that defines a set of beams having a smallest 3 dB beamwidth among all transmit beams on which the base station can transmit. Further, generating the beamforming weights for the downlink channel to be transmitted on the downlink from the base station to the wireless device comprises determining a required 3 dB beamwidth and a required angle of departure for transmission of the downlink channel to the wireless device based on the filtered set of coefficients for the set of spatial orthonormal functions, determining a spatial orthonormal function based on the required 3 dB beamwidth and the required angle of departure, and computing the beamforming weights for the downlink channel based on the determined spatial orthonormal function.

In some embodiments, projecting the estimate of the channel matrix onto the one or more sets of spatial orthonormal functions comprises projecting the estimate of the channel matrix onto one or more sets of spatial orthonormal functions. Further, generating the beamforming weights for the downlink channel to be transmitted on the downlink from the base station to the wireless device comprises determining a required 3 dB beamwidth and a required angle of departure for transmission of the downlink channel to the wireless device based on the filtered set of coefficients for the set of spatial orthonormal functions, determining a spatial orthonormal function based on the required 3 dB beamwidth and the required angle of departure, and computing the beamforming weights for the downlink channel based on the determined spatial orthonormal function. In some embodiments, determining a required 3 dB beamwidth and a required angle of departure for transmission of the downlink channel to the wireless device based on the filtered set of coefficients for the set of spatial orthonormal functions comprises determining the spatial orthonormal function with the largest coefficient, determining a required angle of departure by further finding the maximum gain angle for the selected orthonormal function, and determining a 3 dB beamwidth by finding the difference of angles on either side of the maximum gain angle which represent 3 dB lower gain compared to the maximum gain. In some embodiments, determining a spatial orthonormal function based on the required 3 dB beamwidth and the required angle of departure comprises comparing the determined 3 dB beamwidth with the required beamwidth and generating another orthonormal function with required angle of departure and 3 dB beamwidth. In some embodiments, generating the orthonormal function is iteratively evaluated until a desired angle of departure accuracy is achieved. In some embodiments, the required 3 dB beamwidth is determined as the time variation of estimated angle of departure.

In some embodiments, computing the beamforming weights for the downlink channel based on the determined spatial orthonormal function comprises scaling the determined spatial orthonormal function based on a scaling factor, the scaling factor being such that a total transmit power is within predefined limits of an allowed transmit power range for the base station.

In some embodiments, the steps of obtaining the estimate of the channel matrix, projecting the estimate of the channel matrix, filtering, generating the beamforming weights, and precoding are performed for each of two or more subbands.

Embodiments of a base station, communication system, and a method in a communication system are also disclosed.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
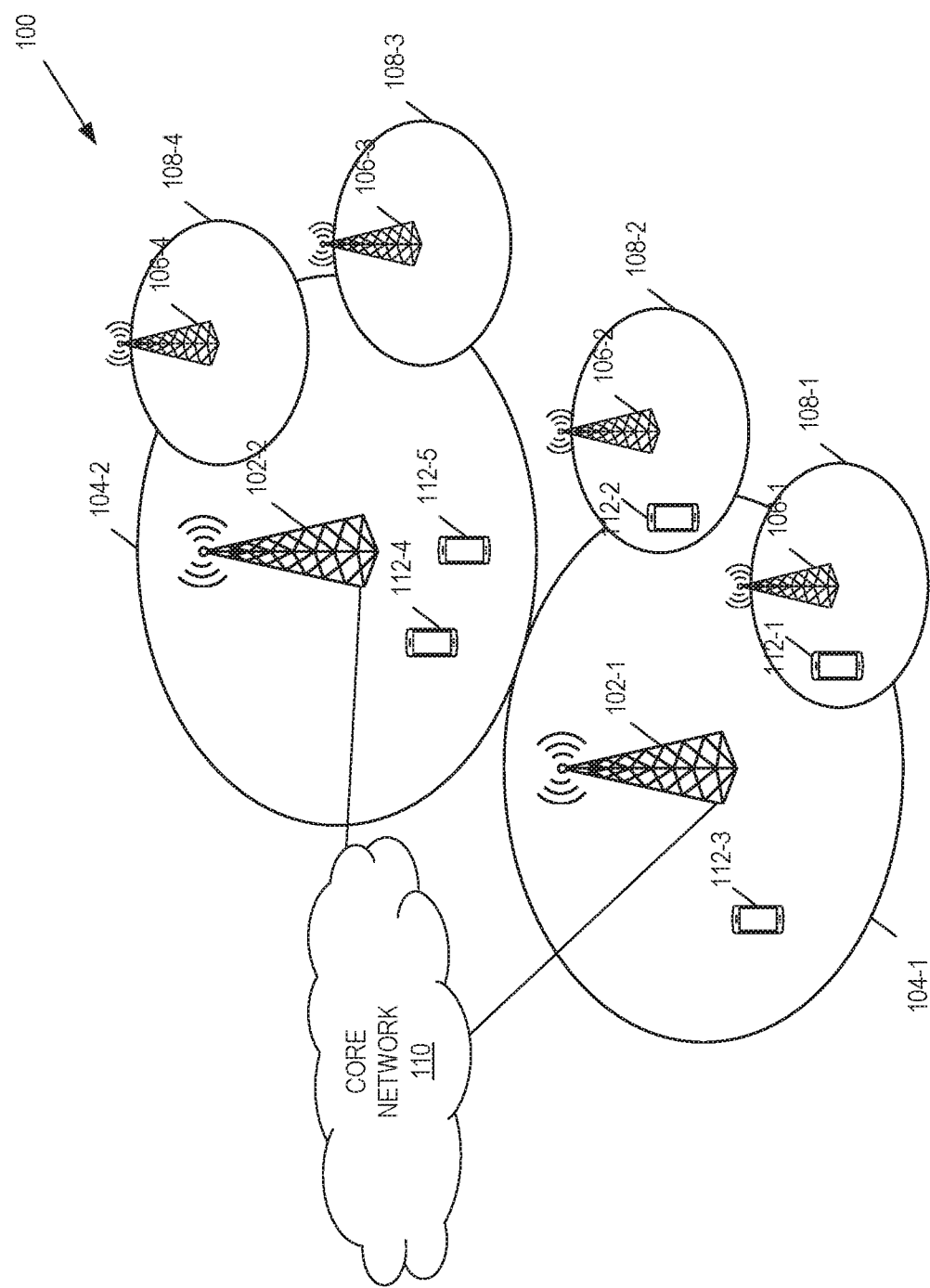
FIG. 1 illustrates one example of a cellular communications network according to some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

Systems and methods are disclosed herein that provide low-complexity precoding for each of two or more physical downlink channel types from one wireless device feedback.

In some embodiments, weights (referred to herein as beamforming weights) for a precoder for a physical downlink control channel (e.g., Physical Downlink Control Channel (PDCCH)) can be derived based on implicit or explicit channel state feedback from a wireless device (e.g., a UE). The feedback from the wireless device is based on reference signals transmitted to assist channel estimation on the downlink. The feedback may be intended for physical downlink traffic or data channel (e.g., a Physical Downlink Shared Channel (PDSCH)) transmission. The same feedback is, in this embodiment, used to derive the (e.g., optimum) weights for the physical downlink control channel precoder.

In some embodiments, the feedback (i.e., the feedback information or parameters) is passed through a set of orthonormal spatial functions. In other words, the feedback is used to provide estimates of a channel matrix for multiple time instants and optionally for two or more subbands of the downlink frequency band. Each of these estimates is projected onto a set of orthonormal spatial functions. As a result, multiple sets of coefficients of the orthonormal spatial functions are determined over time and optionally frequency. The determined sets of coefficients of the orthonormal spatial functions are filtered in time and optionally frequency. In some embodiments, this filtering is performed based on a filtering parameter that is specific to a PDCCH on which a transmission is to be performed. In some embodiments, the filtering parameter in the time domain and optionally frequency domain is determined based on the expected channel variation in time and frequency respectively. Weights for the PDCCH precoder are computed from the filtered coefficients for the orthonormal spatial functions.

In some other embodiments, the feedback (i.e., the feedback information or parameters) is passed through a set of orthonormal spatial functions. In other words, the feedback is used to provide estimates of a channel matrix for multiple time instants and optionally for two or more subbands of the downlink frequency band. Each of these estimates is projected onto at least two sets of orthonormal spatial functions. As a result, multiple sets of coefficients for each set of orthonormal spatial functions are determined over time and optionally frequency. The determined sets of coefficients for each set of orthonormal spatial functions are filtered in time and optionally frequency. In some embodiments, this filtering is performed based on a filtering parameter that is specific to a PDCCH on which a transmission is to be performed. In some embodiments, the filtering parameter in the time domain and optionally frequency domain is determined based on the expected channel variation in time and frequency respectively. One set of the orthonormal functions is selected to satisfy a set of criteria. In some embodiments, the set of orthonormal functions in which the fewest number of orthonormal functions are used to reconstruct the channel matrix is selected as the best set. In some embodiments, the set of orthonormal functions which can reconstruct channel matrix with smallest error is selected as the best set. In some other embodiments, the set of orthonormal functions which can reconstruct channel matrix with prescribed number of orthonormal functions and useful signal in the other orthonormal functions within the set is minimal is selected as the best set. In some embodiments, any combination of the aforementioned embodiments can be performed to select the best set. Weights for the PDCCH precoder are computed from the filtered coefficients of the selected orthonormal spatial functions of the selected orthonormal function set.

In some embodiments, the feedback (i.e., the feedback information or parameters) is passed through a set of orthonormal spatial functions. In other words, the feedback is used to provide estimates of a channel matrix for multiple time instants and optionally for two or more subbands of the downlink frequency band. Each of these estimates is projected onto a set of orthonormal spatial functions. As a result, multiple sets of coefficients of the orthonormal spatial functions are determined over time and optionally frequency. The determined coefficients of the orthonormal spatial functions are filtered in time and optionally frequency. In some embodiments, this filtering is performed based on a filtering parameter that is specific to a PDCCH on which a transmission is to be performed. In some embodiments, the filtering parameter in the time domain and optionally frequency domain is determined based on the expected channel variation in time and frequency respectively. A required beamwidth and Angle of Departure (AoD) are determined. The weights for the PDCCH precoder are computed based on the required beamwidth and AoD.

In accordance with embodiments of the present disclosure, the beamwidth for transmission of each physical channel is adjusted seamlessly.

FIG. 1 illustrates one example of a cellular communications network 100 in which embodiments of the present disclosure may be implemented. In the embodiments described herein, the cellular communications network 100 is a 5G NR network. In this example, the cellular communications network 100 includes base stations 102-1 and 102-2, which in LTE are referred to as eNBs and in 5G NR are referred to as gNBs, controlling corresponding macro cells 104-1 and 104-2. The base stations 102-1 and 102-2 are generally referred to herein collectively as base stations 102 and individually as base station 102. Likewise, the macro cells 104-1 and 104-2 are generally referred to herein collectively as macro cells 104 and individually as macro cell 104. The cellular communications network 100 may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The base stations 102 (and optionally the low power nodes 106) are connected to a core network 110.

The base stations 102 and the low power nodes 106 provide service to wireless devices 112-1 through 112-5 in the corresponding cells 104 and 108. The wireless devices 112-1 through 112-5 are generally referred to herein collectively as wireless devices 112 and individually as wireless device 112. The wireless devices 112 are also sometimes referred to herein as UEs.

Figure 2:
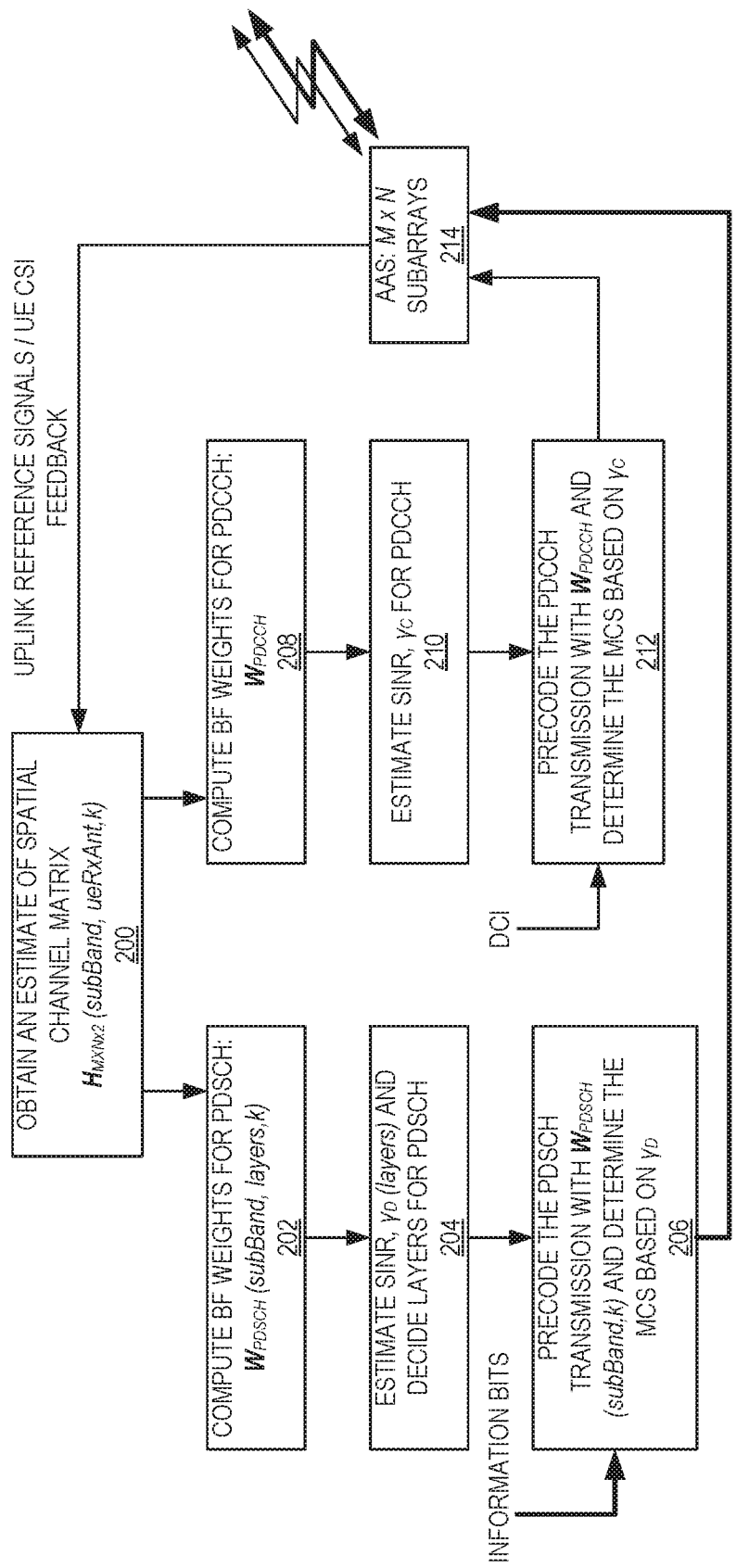
FIG. 2 illustrates a method of operation of a base station (or likewise a low power node) to perform precoding of two (or more) types of physical downlink channels based on the same feedback information in accordance with some embodiments of the present disclosure.

Embodiments are described herein for precoding physical downlink channels transmitted by a base station 102 (or likewise a low power node 106). In this regard, FIG. 2 illustrates a method of operation of a base station 102 (or likewise a low power node 106) to perform precoding of two (or more) types of physical downlink channels based on the same feedback information in accordance with some embodiments of the present disclosure. In this example, the physical downlink channels are a physical downlink data channel, namely a PDSCH, and a physical downlink control channel, namely a PDCCH. Note, however, that PDSCH and PDCCH are only examples.

As illustrated, at a time instant k, the base station 102 obtains estimates of a spatial channel matrix $H_{M \times N \times 2}$ (subBand, ueRxAnt, k) for a wireless channel from the base station 102 to a particular wireless device 112 for two or more subbands of the full downlink frequency band for one or more receive antennas of the wireless device 112 (step 200). Thus, in this example, the estimate of the spatial channel matrix $H_{M \times N \times 2}$ (subBand, ueRxAnt, k) is for a particular subband of the full downlink frequency band (denoted as subBand) for a particular receive antenna of the wireless device 112 (denoted as ueRxAnt) at time instant k. The full downlink frequency band may be logically divided into two or more subbands. Also, the wireless device 112 may include one or more receive antennas. Note that M×N defines a number of subarrays in an antenna system of the base station arranged in N rows and M columns where each subarray consists of P polarizations. The antenna system may use two or more polarizations. Here, there are two polarizations, as indicated by M×N×2. Here subarray may consist of one or more antenna elements for each polarization and these antenna elements are formed into one subarray element by weighted combining.

Each estimate of the spatial channel matrix $H_{M \times N \times 2}$ (subBand, ueRxAnt, k) at time instant k may be obtained using any desired technique. However, the estimate of the spatial channel matrix $H_{M \times N \times 2}$ (subBand, ueRxAnt, k) is obtained from the same feedback from the wireless device 112 for both physical downlink channels. This feedback is, in some embodiments, feedback provided by the wireless device 112 for PDSCH transmission. Thus, the feedback for the PDSCH transmission is used by the base station 102 to generate weights (referred to herein as beamforming weights) for both the PDSCH precoder and the PDCCH precoder. As a result, as discussed below, separate beamforming weights are computed for the PDSCH precoder and the PDCCH precoder without increasing the feedback overhead.

For PDSCH, the base station 102 computes beamforming weights for a PDSCH transmission at time instant k for different possible combinations of transmit layers based on the estimates of the spatial channel matrix $H_{M \times N \times 2}$ (subBand, ueRxAnt, k) (step 202). The beamforming weights for a particular subband (denoted subBand) for a particular combination of transmit layers (referred to as a hypothesis Hyp) for a particular number of transmit layers (referred to as $N_{layers}$) at time instant k are denoted herein as $W_{PDSCH}$ (subBand, Hyp, k, $N_{layers}$). Details regarding the computation of the beamforming weights $W_{PDSCH}$(subBand, Hyp, k, $N_{layers}$) are provided below.

In some embodiments, the base station 102 estimates a Signal to Interference plus Noise Ratio (SINR) per layer for each of the different combinations of transmit layers and decides, or selects, the best combination of layers (i.e., best Hyp for a given $N_{layers}$) to be used for the PDSCH transmission (step 204). In some embodiments, the best Hyp for a given number of layers, $N_{layers}$, is determined for each subband. The estimated SINR per layer for a particular number of layers is denoted herein as $\gamma_D$(layer, subBand, $N_{layers}$). The SINR can be computed, for example, by computing the composite downlink channel as seen by the wireless device 112 and assuming a wireless device receiver, such as Minimum Mean Square Error (MMSE) receiver. With the help of channel state feedback received from the wireless device 112, the downlink interference plus noise can also be calculated to compute the downlink SINR. The composite downlink channel in the frequency domain can be expressed as the multiplication of the precoder weights and the estimated downlink channel. In some other embodiments, the base station 102 further estimates Information Carrying Capacity (ICC) for each of the different numbers of transmit layers and decides, or selects, the number of layers to be used for the PDSCH transmission, in step 204, which maximize the accumulated ICC across all the layers and subbands. Here ICC is defined as the number of information bits that can be transmitted successfully over PDSCH, assuming that all the subbands are allocated to the PDSCH. The accumulated ICC is the information bits across all the layers and subbands that can be successfully transmitted over the PDSCH. For example, the number of transmission layers can be derived such that the following matric is maximized:

$$\sum_{layer=1}^{N_{layers}} \sum_{subBand} ICC[\gamma_D(\text{layer, subBand, } N_{layers})]$$

In some embodiments the successful transmission can be interpreted as the information bits can be transmitted to meet a certain criteria, such as with a prescribed packet error rate or block error or bit error rate or to meet prescribed a packet delay budget. For each time instant k and each subband, the base station 102 precodes a number of information bits to be transmitted on the PDSCH with the respective beamforming weights $W_{PDSCH}$(subBand, Hyp, k, $N_{layers}$) for the selected number and combination of layers and determines a modulation and coding scheme based on the estimated SINR $\gamma_D$ for the selected combination of layers, Hyp (step 206). The beamforming weights $W_{PDSDH}$(subBand, Hyp, k, $N_{layers}$) for the selected number and combination of layers is referred to herein as the beamforming weights $W_{PDSDH}$(subBand, k) for PDSCH for the respective subband. For example, the MCS can be derived as follows: First the ICC accumulated over all the layers and over the allocated subbands of the PDSCH can be computed for each supported modulation schemes, e.g., QPSK, QAM16, QAM64, QAM256, etc. The best modulation which provides the highest accumulated ICC is selected as the modulation for PDSCH transmission. In the next step, based on the ICC and the supported Transmission Block Sizes (TBSs) for each MCS of the selected modulation, MCS is selected. In other words the required coderate decides the MCS.

For the PDCCH, the base station 102 computes beamforming weights for a PDCCH transmission at time instant k based on the estimates of the spatial channel matrix $H_{M \times N \times 2}$ (subBand, ueRxAnt, k) for each subband and wireless device receive antenna (step 208). For each subband, the beamforming weights at time instant k are denoted herein as $W_{PDCCH}$(subBand, k). Details regarding the computation of the beamforming weights $W_{PDCCH}$(subBand, k) are provided below. Note that, in some embodiments, rather than computing the beamforming weights at time instant k for each subband, the estimates of the spatial channel matrix $H_{M \times N \times 2}$ (subBand, ueRxAnt, k) for each subband and wireless device receive antenna can be averaged over all subbands and used to compute beamforming weights $W_{PDCCH}$ (ueRxAnt, k) for the entire frequency band for each receive antenna of the wireless device 112. The beamforming weights $W_{PDCCH}$(ueRxAnt, k) for each receive antenna may be combined into a single matrix form, which is referred to herein as beamforming weights $W_{PDCCH}$(k). In some other embodiments, the coefficients of the orthonormal functions (discussed below) for the multiple subbands can be averaged and used to compute beamforming weights $W_{PDCCH}$ (ueRxAnt, k) for the entire frequency band, where these beamforming weights $W_{PDCCH}$(ueRxAnt, k) for each receive antenna may be combined into a single matrix form, which is referred to herein as beamforming weights $W_{PDCCH}$(k).

In some embodiments, the base station 102 estimates a SINR for the PDCCH (step 210). The estimated SINR for PDCCH is denoted herein as $\gamma_c$. The base station 102 then precodes Downlink Control Information (DCI) to be transmitted on the PDCCH with the beamforming weights $W_{PDCCH}$ and determines a modulation and coding scheme is based on the estimated SINR $\gamma_c$ (step 212).

The PDSCH transmission and the PDCCH transmission are transmitted by the base station 102 via the antenna system (i.e., the Antenna Array System (AAS) in this example) of the base station 102 (step 214). The process is then repeated for the next time instant k.

Thus, FIG. 2 illustrates a process for computing downlink precoding or Beamforming (BF) weights for beamforming from the estimates of the spatial channel matrix. The procedure can be different for traffic (i.e., data) and control channels if the performance targets for the reception for traffic and control channel is different. However, the explained procedures are equally applicable to both the control and traffic channels. As depicted, the precoding weights for transmitting PDSCH and PDCCH, $W_{PDSCH}$ and $W_{PDCCH}$ respectively, are derived from the estimated spatial channel matrix $H_{M \times N \times 2}$ for the AAS at the base station 102. The estimates of the spatial channel matrix, $H_{M \times N \times 2}$ can, for example, either be derived from a received signal on the uplink from the wireless device 112 or be reconstructed from feedback (e.g., Channel State Information (CSI) feedback) received from the wireless device 112.

Several example embodiments of a procedure by which the base station 102 computes the beamforming weights for, in these examples, PDSCH and PDCCH will now be described.

In a first embodiment, filtering of the beam components is performed to make the channel estimate less sensitive to variance with respect to time and frequency. More specifically, the channel matrix for the wireless channel between the base station 102 and the wireless device 112 for each subband and for each receive antenna of the wireless device 112 at time k can be expressed as follows:

$$H_{M \times N \times 2}(subBand, ueRxAnt, k) = \qquad \text{Eqn. (1)}$$
$$\sum_{p=0}^{1} \sum_{j=0}^{N-1} \sum_{i=0}^{M-1} \alpha_{ijp}(subBand, ueRxAnt, k) f_{M \times N \times 2}(i, j, p)$$

Here, each subband (subBand) is defined as a segment of the frequency band over which the channel characteristics do not change significantly. Typically, the size of a subband (subBand) depends on the deployment. $f_{M \times N \times 2}(i,j,p)$ for i=0, 1, ..., M-1, j=0, 1, ..., N-1, and p=0, 1 represents a set of spatial orthonormal functions assuming the base station 102 (e.g., eNB/gNB) transmit antenna array has N rows, M columns cross-polarized antenna sub-arrays. The set of spatial orthonormal functions $f_{M \times N \times 2}$ (i,j,p) for i=0, 1, ..., M-1, j=0, 1, ..., N-1, and p=0, 1 can be represented as a set $\{f_{M \times N \times 2} (0,0,0), f_{M \times N \times 2}(0,0,1), \ldots, f_{M \times N \times 2} (M-1, N-1,1)\}$, where each $f_{M \times N \times 2}(i,j,p)$ is one of the spatial orthonormal functions in the set. For shorthand, the set of spatial orthonormal functions is sometimes referred to herein as $\{f\}$. As one example, the set of spatial orthonormal functions $f_{M \times N \times 2}(i,j,p) = \{f_{M \times N \times 2}(0,0,0), f_{M \times N \times 2}(0,0,1), \ldots, f_{M \times N \times 2} (M-1, N-1,1)\}$ may represent M×N×2 dimensional Discrete Fourier Transform (DFT) vectors. In general, these spatial orthonormal functions are any orthonormal function set in the spatial domain represented by the M×N×2 antenna array. Coefficients $\alpha_{ijp}$ are computed by projecting $H_{M \times N \times 2}$ onto $\{f\}$.

The spatial channel matrix $H_{M \times N \times 2}$ can be approximated by $\hat{H}_{M \times N \times 2}$ as follows:

$$\hat{H}_{M \times N \times 2}(subBand, ueRxAnt, k) = \qquad \text{Eqn. (2)}$$
$$\sum_{(i,j,p) \in S(k)} \alpha_{i,j,p}(subBand, ueRxAnt, k) f_{M \times N \times 2}(i, j, p)$$

to guarantee the criterion:

$$\| H_{M \times N \times 2}(subBand, ueRxAnt, k) - $$
$$\hat{H}_{M \times N \times 2}(subBand, ueRxAnt, k) \| \leq \epsilon$$

or $$\sum_{\forall subBand} \| H_{M \times N \times 2}(subBand, ueRxAnt, k) - $$
$$\hat{H}_{M \times N \times 2}(subBand, ueRxAnt, k) \| \leq \epsilon$$

or $$\sum_{\forall ueRxAnt} \sum_{\forall subBand} \| H_{M \times N \times 2}(subBand, ueRxAnt, k) - $$
$$\hat{H}_{M \times N \times 2}(subBand, ueRxAnt, k) \| \leq \epsilon$$

where S(k) represents a set of orthonormal functions (i.e., a subset of the set of spatial orthonormal functions $\{f\}$) that captures most of the useful signal power at time k. $\epsilon$ is a small positive number which should guarantee that the useful signal power contained in the unselected orthonormal functions is insignificant and that the SINR is not adversely affected.

In a closed loop Multiple Input Multiple Output (MIMO) system, the beamforming weights of the transmit precoder for PDSCH and PDCCH for each subband at time k or kth transmission time interval, W(subBand, k), can be computed from the channel matrices, $\hat{H}_{M \times N \times 2}$(subBand, ueRxAnt, k) as follows:

$$W(\text{subBand}, k) = h(H(\text{subBand}, k), N_0) \qquad \text{Eqn. (3)}$$

where H(subBand, k)={$\hat{H}_{M \times N \times 2}$(subBand, ueRxAnt, k), for all UE rx antennas}. For example, for $N_{ueRxAnt}$ UE receive antennas, H can be formed as follows:

$$H(\text{subBand}, k) = \begin{bmatrix} \hat{H}_{M \times N \times 2}(\text{subBand}, 0, k) \\ \hat{H}_{M \times N \times 2}(\text{subBand}, 1, k) \\ \ldots \\ \hat{H}_{M \times N \times 2}(\text{subBand}, N_{ueRxAnt} - 1, k) \end{bmatrix}$$

H is a $N_{ueRxAnt} \times v$ matrix, where v=M*N*2. The function h( ) represents a function for converting the channel matrices to the precoding matrix based on a predefined cost function, $N_0$ is the estimate of the downlink interference plus noise covariance matrix, and $$\hat{H}_{M \times N \times 2}(\text{subBand}, ueRxAnt, k) = \qquad \text{Eqn. (4)}$$
$$\sum_{\{i,j,p\} \in S_F(k)} \overline{\alpha}_{i,j,p}(\text{subBand}, ueRxAnt, k) f_{M \times N \times 2}(i, j, p)$$

to guarantee the criterion:

$$\| H_{M \times N \times 2}(\text{subBand}, ueRxAnt, k) -$$
$$\hat{H}_{M \times N \times 2}(\text{subBand}, ueRxAnt, k) \| \leq \epsilon$$

or $$\sum_{\forall \text{subBand}} \| H_{M \times N \times 2}(\text{subBand}, ueRxAnt, k) -$$
$$\hat{H}_{M \times N \times 2}(\text{subBand}, ueRxAnt, k) \| \leq \epsilon$$

or $$\sum_{\forall ueRxAnt} \sum_{\forall \text{subBand}} \| H_{M \times N \times 2}(\text{subBand}, ueRxAnt, k) -$$
$$\hat{H}_{M \times N \times 2}(\text{subBand}, ueRxAnt, k) \| \leq \epsilon$$

where $S_F(k)$ represents a set of orthonormal functions which capture most of the useful signal information at time k, and $\overline{\alpha}_{i,j,p}$ is a filtered version of $\alpha_{i,j,p}$ (filtered in time and optionally in frequency domain). For example, $\alpha_{i,j,p}$ can be filtered separately across the frequency band and in time as follows:

$$\overline{\alpha}_{i,j,p}(\text{subBand}, ueRxAnt, k) = \beta^T_{i,j,p}(\text{subBand}, ueRxAnt, k-T) + (1-\beta^T)\hat{\alpha}_{i,j,p}(\text{subBand}, ueRxAnt, k) \qquad \text{Eqn. (5)}$$

where $\hat{\alpha}_{i,j,p}$(subBand, ueRxAnt, k) is the filtered $\alpha_{i,j,p}$ across the subbands.

$$\hat{\alpha}_{i,j,p}(\text{subBand}, ueRxAnt, k) =$$
$$g(\alpha_{i,j,p}(\text{subBand}, ueRxAnt, k), \text{for all subbands}) \qquad \text{Eqn. (6)}$$

Note that $\overline{\alpha}_{i,j,p}$(subBand, ueRxAnt, k) is the time-filtered version of $\alpha_{i,j,p}$(subBand, ueRxAnt, k), and $\hat{\alpha}_{i,j,p}$(subBand, ueRxAnt, k) is the frequency-filtered version of $\alpha_{i,j,p}$(subBand, ueRxAnt, k). Here, the function g( ) represents the channel correlation across the subbands. For example, g( ) can be formulated as follows:

$$\hat{\alpha}_{i,j,p}(\text{subBand}, ueRxAnt, k) =$$
$$\sum_{sb=-N_{sb1}}^{N_{sb2}} A(sb)\alpha_{i,j,p}(\text{subband} + sb, ueRxAnt, k)$$

When subband+sb is outside the range of defined subbands for any subband, $\hat{\alpha}_{i,j,p}$ (subBand, ueRxAnt, k) can be equated to the $\hat{\alpha}_{i,j,p}$(subBand−1, ueRxAnt, k) or $\hat{\alpha}_{i,j,p}$ (subBand+1, ueRxAnt, k) whichever is already computed and valid. Alternatively, g( ) can be formulated as follows:

$$\hat{\alpha}_{i,j,p}(\text{subBand} - N_{sb1}, ueRxAnt, k) =$$
$$\ldots = \hat{\alpha}_{i,j,p}(\text{subBand\_}N_{sb2}, ueRxAnt, k) =$$
$$\sum_{sb=-N_{sb1}}^{N_{sb2}} A(sb)\alpha_{i,j,p}(\text{subband} + sb, ueRxAnt, k)$$

Here all the $\hat{\alpha}_{i,j,p}$ within the subband range of subBand-$N_{sb1}$ and subBand-$N_{sb2}$ are the same. When $N_{sb1}$=0 and $N_{sb2}$ is equal to the maximum number of subbands, the above equation results in same $\hat{\alpha}_{i,j,p}$ for all the subbands. This case further results into a wideband precoder matrix. Alternatively, $\overline{\alpha}_{i,j,p}$ can be Two Dimensionally (2D) filtered in time and frequency using time-frequency correlation function of the channel.

In some embodiments, separate filtering parameters β are defined for PDSCH and PDCCH. These separate filtering parameters are denoted herein as $\beta_{PDSCH}$ and $\beta_{PDCCH}$. The filtering parameters $\beta_{PDSCH}$ and $\beta_{PDCCH}$ for PDSCH and PDCCH can be different. Similarly, the frequency domain averaging can be also different for PDSCH and PDCCH. In some embodiments, the filtering parameters $\beta_{PDSCH}$ and $\beta_{PDCCH}$ for PDSCH and PDCCH in the time domain and optionally frequency domain are determined based on the expected channel variation in time and frequency respectively. For example, when the channel is varying slowly in time, the filtering parameter is adjusted such that the current filtered coefficient is obtained as a sum of the previously obtained filtered coefficient, weighted by a higher number, such as $\sqrt{0.9}$ (i.e., close to 1), and the currently computed coefficient, weighted by smaller number, i.e., $\sqrt{0.1}$ (= $\sqrt{1-0.9}$). When the channel is varying faster in time, the filtering parameter is adjusted such that the current filtered coefficient is obtained as a sum of the previously obtained filtered coefficient, weighted by a smaller number, such as $\sqrt{0.1}$ (i.e., close to 0), and the currently computed coefficient, weighted by larger number, i.e., $\sqrt{0.9}$ (=$\sqrt{1-0.1}$). Similarly, when the channel is significantly different for each subband or subcarrier (i.e., frequency selective), the filtering parameters for frequency domain filtering are adjusted such that the coefficient for the current subband is obtained as a sum of the computed filtered coefficient for the current subband, weighted by a higher number, such as $\sqrt{0.9}$ (i.e., close to 1), and the computed coefficients from the subbands on either side of the current subband, weighted by smaller numbers (sum of the numbers=$\sqrt{1-0.9}$). When the channel is very much the same for each subband or subcarrier (i.e., frequency selective) in the same TTI, the filtering parameters for frequency domain filtering are adjusted such that the coefficient for the current subband is obtained as a sum of the computed filtered coefficient for the current subband, weighted by a smaller number, such as $\sqrt{0.1}$ (i.e., close to 0), and the computed coefficients from the subbands on either side of the current subband, weighted by similar numbers (sum of the numbers=$\sqrt{1-0.1}$). The above explanation of examples of the filtering methods in time and frequency assume Infinite Impulse Response (IIR) and Finite Impulse Response (FIR) filtering methods respectively. In general, any of these filtering methods can be used for coefficient filtering in time or in frequency.

The filtering parameters used for PDCCH can be different from the filtering parameters used for PDSCH. The difference in the filtering parameters is related to the expected reception quality of PDCCH and PDSCH. For example, PDCCH has to be more robust than PDSCH, i.e. expected error rate for PDCCH is much lower than the expected error rate of PDSCH. To achieve that the beamforming gain should be consistent with the rate of change of channel variations in frequency and time. One way to achieve this is setting the beamwidth for PDCCH broader than PDSCH. This makes sure that the PDCCH is always transmitted towards the UE even when the channel is varying faster. For example, h( ) in Eqn. (3) for Minimum Mean Square Error (MMSE) optimization can be expressed as follows:

$$W(\text{subBand},k)=(H^H(\text{subBand},k)H(\text{subBand},k)+N_0)^{-1}\hat{H}_{M\times N\times 2}^H \quad \text{Eqn. (7a)}$$

where $N_0$ is the estimate of the downlink interference plus noise covariance matrix. This matrix can be obtained from the UE feedback information. In a case where the downlink interference plus noise is uncorrelated (or assumed to be uncorrelated), $N_0$ can be approximated as $N_0 I_{N\times N}$, where $N_0$ is the variance of signal plus interference and $I_{N\times N}$ is the identity matrix of size N. The resulting matrix W(subBand, k) is of size v×number of UE receive antennas, $N_{ueRxAnt}$.

In another example, h( ) in Eqn. (3) for MMSE optimization can be expressed as follows:

$$W(\text{subBand},k)=(H(\text{subBand},k)H^H(\text{subBand},k)+G_0+N_0 I_{L\times L})^{-1}\hat{H}_{M\times N\times 2}^H \quad \text{Eqn. (7b)}$$

where $G_0$ is an estimate of the uplink interference covariance matrix. This matrix can be measured from the uplink reception from wireless devices attached to neighbouring cells.

Figure 3:
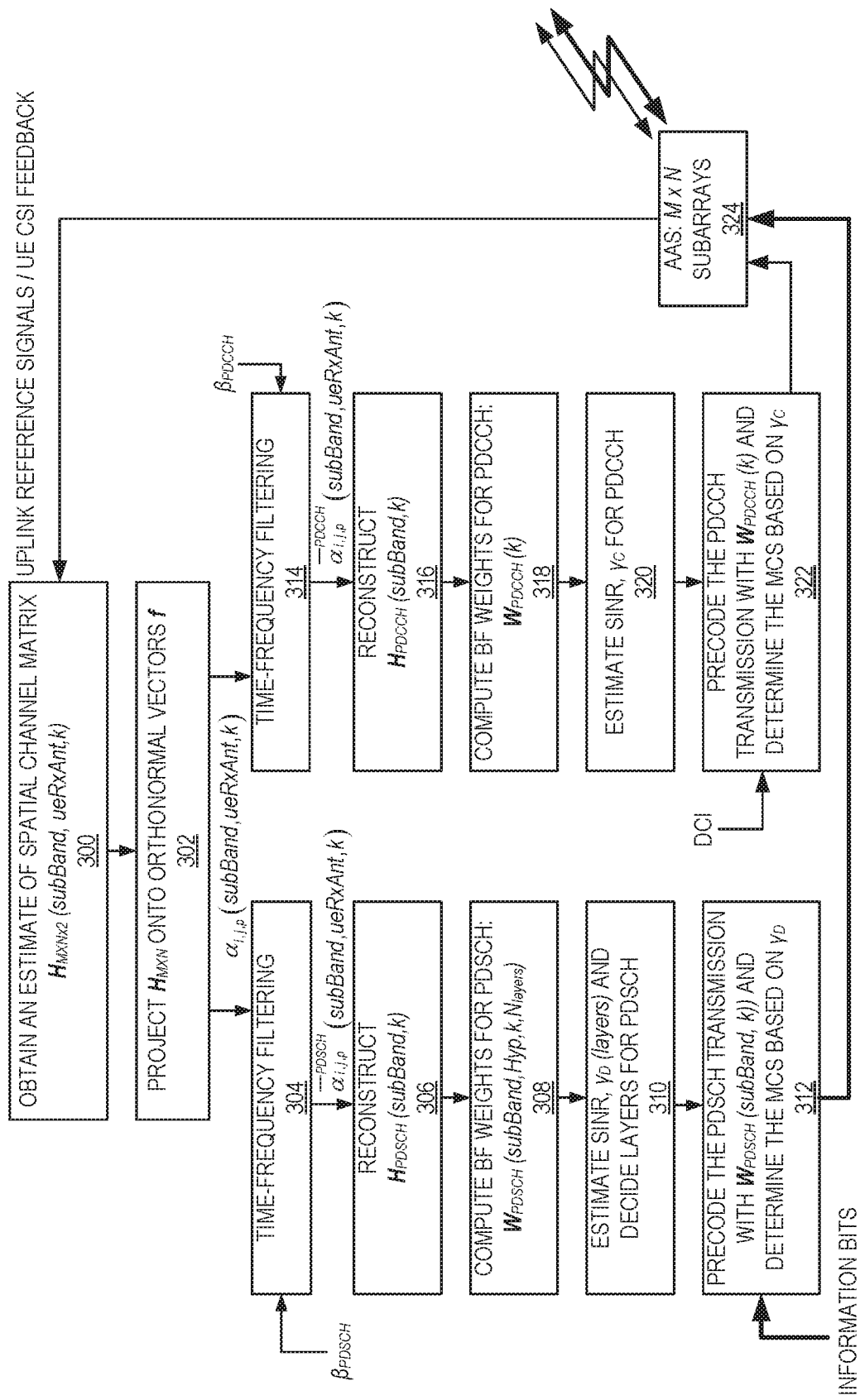
FIG. 3 illustrates the process of FIG. 2 in more detail in accordance with a first embodiment of the present disclosure.

FIG. 3 illustrates the process of FIG. 2 in more detail in accordance with the first embodiment of the present disclosure described above. As illustrated, at time instant k, the base station 102 obtains estimates of a spatial channel matrix $H_{M\times N\times 2}$ (subBand, ueRxAnt, k) for a wireless channel from the base station 102 to a particular wireless device 112 for two or more subbands of the full downlink frequency band for one or more UE receive antennas (step 300). Each estimate of the spatial channel matrix $H_{M\times N\times 2}$(subBand, ueRxAnt, k) may be obtained using any desired technique. However, the estimate of the spatial channel matrix $H_{M\times N\times 2}$ (subBand, ueRxAnt, k) is obtained from the same feedback from the wireless device 112 for both physical downlink channels. This feedback is, in some embodiments, feedback provided by the wireless device 112 for PDSCH transmission. Thus, the feedback for the PDSCH transmission is used by the base station 102 to generate weights (referred to herein as beamforming weights) for both the PDSCH precoder and the PDCCH precoder. As a result, as discussed below, separate beamforming weights are computed for the PDSCH precoder and the PDCCH precoder without increasing the feedback overhead.

In this embodiment, in order to compute the beamforming weights for the PDSCH and PDCCH transmissions, the base station 102 first projects each of the estimates of the spatial channel matrix $H_{M\times N\times 2}$(subBand, ueRxAnt, k) at time instant k onto the set of spatial orthonormal functions $\{f\}$ in accordance with Eqn. (1) thereby obtaining multiple sets of coefficients $\alpha_{i,j,p}$, one set for each combination of subBand, ueRxAnt for the current time instant k (step 302). Thus, steps 300 and 302 produce a separate set of coefficients $\alpha_{i,j,p}$ (subBand, ueRxAnt, k) for the time instant k for each subband for each receive antenna of the wireless device 112.

For PDSCH, the base station 102 performs filtering of the coefficients $\alpha_{i,j,p}$ (subBand, ueRxAnt, k) in time and optionally frequency based on a respective filtering parameter $\beta_{PDSCH}$, as described above, e.g., with respect to Eqn. (5) and Eqn. (6) (step 304). Note that filtering in time takes into account coefficients $\alpha_{i,j,p}$(subBand, ueRxAnt, k) computed for a previous time instant(s). The result of the filtering is filtered coefficients $\overline{\alpha}_{i,j,p}^{PDSCH}$ (subBand, ueRxAnt, k). Using the filtered coefficients $\overline{\alpha}_{i,j,p}^{PDSCH}$ (subBand, ueRxAnt, k), the base station 102 reconstructs a channel matrix $H_{PDSCH}$(subBand, k) for PDSCH for time instant k for each subband in accordance with Eqn. (4) (step 306). More specifically, at time instant k, the reconstructed channel matrix $H_{PDSCH}$(subBand, k) for PDSCH for each particular subband can be written as:

$$H_{PDSCH}(\text{subBand}, k) = \begin{bmatrix} H_{PDSCH}(\text{subBand}, 0, k) \\ H_{PDSCH}(\text{subBand}, 1, k) \\ \vdots \\ H_{PDSCH}(\text{subBand}, N_{ueRxAnt} - 1, k) \end{bmatrix}$$

where $$H_{PDSCH}(\text{subBand}, ueRxAnt, k) = \hat{H}_{M\times N\times 2}(\text{subBand}, ueRxAnt, k) = \sum_{(i,j,p)\in S_F(k)} \overline{\alpha}_{i,j,p}^{PDSCH}(\text{subBand}, ueRxAnt, k) f_{M\times N\times 2}(i, j, p)$$

where $H_{PDSCH}$(subBand, ueRxAnt, k) is a reconstructed channel matrix for PDSCH for a particular subband and wireless device receive antenna and $\hat{H}_{M\times N\times 2}$(subBand, ueRxAnt, k) is defined in Eqn. (4).

The beamforming weights $W_{PDSCH}$(subBand, k) for PDSCH for each subband are computed using the reconstructed channel matrix $H_{PDSCH}$(subBand, k) for PDSCH using Eqn. (3) (step 308). More specifically, for PDSCH, the number of transmission layers $N_{layer}$ can be any number less than or equal the number of wireless device receive antennas $N_{ueRxAnt}$. Thus, in some embodiments, the base station 102 may compute hypothesized beamforming weights $W_{PDSCH}^{Hyp}$ (subBand, Hyp, k, $N_{layer}$) for each of a number of hypothesized layer combinations (Hyp) for each possible value of $N_{layer}$. Then, the hypothesized beamforming weights $W_{PDSCH}^{Hyp}$ (subBand, Hyp, k, $N_{layer}$) associated with one combination (hypothesis) of transmit layers (e.g., the best combination of transmit layers) for one value of $N_{layer}$ (e.g., the best value of $N_{layer}$) is selected as the $W_{PDSCH}$(subBand, k) for PDSCH for that subband.

In particular, in a closed loop Multiple Input Multiple Output (MIMO) system, the beamforming weights of the transmit precoder for PDSCH (and likewise PDCCH) for each subband at time k or kth transmission time interval and for each hypothesized combination of transmission layers for each possible number of transmission layers of $N_{layer}$, $W_{PDSCH}^{Hyp}$ (subBand, Hyp, k, $N_{layer}$) can be computed from the reconstructed channel matrices, $H_{PDSCH}$ (subBand, ueRxAnt, k) as follows:

$$W_{PDSCH}^{Hyp}(\text{subBand}, Hyp, k, N_{layer}) = h(H_{PDSCH}^{Hyp}(\text{subBand}, Hyp, k, N_{layer}), N_0)$$

where $$H_{PDSCH}^{Hyp}(\text{subBand}, Hyp, k, N_{layer}) = \{\hat{H}_{M \times N \times 2}(\text{subBand}, \mathcal{M}^{Hyp}[\text{layer}, N_{layer}], k), \text{ for all layers}\}.$$

$\mathcal{M}^{Hyp}[\text{layer}, N_{layer}]$ defines a mapping from layer to ueRxAnt based on a hypothesis Hyp. For example, for $N_{layer}$ number layers, for each hypothesis Hyp, a corresponding $H_{PDSCH}^{Hyp}$ can be formed as follows:

$$H_{PDSCH}^{Hyp}(\text{subBand}, Hyp, k, N_{layer}) = \begin{bmatrix} \hat{H}_{M \times N \times 2}(\text{subBand}, M^{Hyp}[0, N_{layer}], k) \\ \hat{H}_{M \times N \times 2}(\text{subBand}, M^{Hyp}[1, N_{layer}], k) \\ \cdots \\ \hat{H}_{M \times N \times 2}(\text{subBand}, M^{Hyp}[N_{layer} - 1, N_{layer}], k) \end{bmatrix}$$

$H_{PDSCH}^{Hyp}$ is a $N_{ueRxAnt} \times V$ matrix, where $v=M*N*2$. layer represents the transmission layer. The number of transmission layers, $N_{layer}$ are in the range of $[1, N_{ueRxAnt}]$, i.e. $N_{layer} \leq N_{ueRxAnt}$. For example, when $N_{ueRxAnt}=4$ and $N_{layer}=3$, the number of subsets that can be formed is the $N_{layer}$ combinations out of $$N_{ueRxAnt}, N_C(N_{layer}) = \binom{N_{ueRxAnt}}{N_{layer}} = 4.$$

The ueRxAnt combinations or hypotheses are $\mathcal{M}^0[\text{layer},3]=\{0,1,2\}$, $\mathcal{M}^1[\text{layer},3]=\{0,1,2\}$, $2[\text{layer},3]=\{0,2,3\}$, and $\{\mathcal{M}^3[\text{layer},3]=1,2,3\}$. A separate $H_{PDSCH}^{Hyp}$ is determined for each of these hypotheses. Further, these hypotheses may be made for each possible value of $N_{layer}$, where a separate $H_{PDSCH}^{Hyp}$ (subBand, k) is determined for each hypothesis for each value of $N_{layer}$.

For each possible value of $N_{layer}$, the resulting precoding matrix for $N_{layer}$ layers, $W_{PDSCH}^{Hyp}$ (subBand, Hyp, k, $N_{layer}$), is computed for all the hypotheses, Hyp=0,1, . . . , $N_C(N_{layer})-1$, for that value of $N_{layer}$. As discussed below with respect to step 310, the best hypothesis from among all the hypotheses for all values of $N_{layer}$ is selected based on SINR and ICC. The best hypothesis corresponds to the $W_{PDSCH}^{Hyp}$ (subBand, Hyp, k, $N_{layer}$) which gives the highest accumulated ICC. This $W_{PDSCH}^{Hyp}$ (subBand, Hyp, k, $N_{layer}$) is referred to as $W_{PDSCH}^{bestHyp}$ and, Hyp, k, $N_{layer}$). As discussed below, $W_{PDSCH}^{bestHyp}$(subBand, Hyp, k, $N_{layer}$) is selected as the beamforming weights $W_{PDSCH}$ (subBand, k,) for PDSCH.

In some embodiments, the base station 102 estimates a SINR for each of the different numbers of transmit layers and the $N_C(N_{layer})$ combinations for each selected number of layers, and decides, or selects, a number of layers to be used for the PDSCH transmission (step 310). The estimated SINR for a particular number of layers is denoted herein as $\gamma_D$(layers). The base station 102 then precodes a number of information bits to be transmitted on the PDSCH with the beamforming weights $W_{PDSDH}$(subBand, Hyp, k, $N_{layers}$) for that correspond to the selected combination of transmission layers (Hyp) and number of transmission layers for the PDSCH transmission and determines a modulation and coding scheme based on the estimated SINR $\gamma_D$ (step 312).

According to another embodiment, $W_{PDSCH}$(subBand, k) is always computed for full rank, i.e., $W_{PDSCH}$ is always computed with the assumption that $N_{layer}=N_{ueRxAnt}$. Subsequently, for each selected transmission layer, a combination of UE receive antennas are selected from the full rank precoding matrix. The number of transmission layers are selected such that the resulting precoder matrix offers the highest aggregate ICC. $W_{PDCCH}$(subBand, k) is computed according to Eqn (3). The size of the matrix for full rank is $v \times N_{ueRxAnt}$ based on Eqn (7a) and Eqn (7b).

For the PDCCH, the base station 102 performs filtering of the sets of coefficients $\alpha_{i,j,p}$(subBand, ueRxAnt, k) in time and optionally frequency based on a respective filtering parameter $\beta_{PDCCH}$, as described above, e.g., with respect to Eqn. (5) and Eqn. (6) (step 314). The result of the filtering is filtered coefficients $\overline{\alpha}_{i,j,p}^{PDCCH}$ (subBand, ueRxAnt, k). Using the filtered coefficients $\overline{\alpha}_{i,j,p}^{PDCCH}$ (subBand, ueRxAnt, k), the base station 102 reconstructs a channel matrix $H_{PDCCH}$(subBand, k) for PDCCH for time instant k for each subband in accordance with Eqn. (4) (step 316). Thus, at time instant k, the reconstructed channel matrix $H_{PDCCH}$(subBand, k) for PDCCH for each particular combination of subband and wireless device receive antenna can be written as:

$$H_{PDCCH}(\text{subBand}, k) = \begin{bmatrix} H_{PDCCH}(\text{subBand}, 0, k) \\ H_{PDCCH}(\text{subBand}, 1, k) \\ \cdots \\ H_{PDCCH}(\text{subBand}, N_{ueRxAnt} - 1, k) \end{bmatrix}$$

where $$H_{PDCCH}(\text{subBand}, ueRxAnt, k) = \hat{H}_{M \times N \times 2}(\text{subBand}, ueRxAnt, k) = \sum_{\{i,j,p\} \in S_F(k)} \overline{\alpha}_{i,j,p}^{PDCCH}(\text{subBand}, ueRxAnt, k) f_{M \times N \times 2}(i, j, p)$$

where $H_{PDCCH}$(subBand, ueRxAnt, k) is a reconstructed channel matrix for PDCCH for a particular subband and wireless device receive antenna and $\hat{H}_{M \times N \times 2}$(subBand, ueRxAnt, k) is defined in Eqn. (4).

Using the reconstructed channel matrix for PDCCH $H_{PDCCH}$(subBand, ueRxAnt, k) for each subband, the base station 102 computes beamforming weights for the PDCCH transmission ($W_{PDCCH}$) in accordance with Eqn. (3) (step 318). In this example, the beamforming weights $W_{PDCCH}$ for the PDCCH transmission apply to the full downlink bandwidth. In some embodiments, the beamforming weights $W_{PDCCH}$ for the PDCCH transmission are computed by first averaging the reconstructed channel matrices $H_{PDCCH}$(subBand, ueRxAnt, k) across all subbands to obtain a wideband reconstructed channel matrix $H_{PDCCH}$(ueRxAnt, k). Subsequently, $H_{PDCCH}$(k) is obtained from $H_{PDCCH}$(ueRxAnt, k) corresponding to a ueRxAnt which gives the maximum $|H_{PDCCH}(\text{ueRxAnt}, k)|^2$. Then, in accordance with Eqn. (3) above, $W_{PDCCH}$(k) can be computed as:

$$W_{PDCCH}(k) = h(H_{PDCCH}(k), N_0)$$

In one alternative embodiment, the filtered coefficients $\overline{\alpha}_{i,j,p}$(subBand, ueRxAnt, k) are averaged across all subbands to provide averaged filtered coefficients $\overline{\alpha}_{i,j,p}$(ueRxAnt, k). Then, the wideband PDCCH beamforming coefficients $W_{PDCCH}(k)$ can be computed as follows. First, a wideband reconstructed channel matrix for PDCCH is computed as:

$$H_{PDCCH}(k) = \hat{H}_{M \times N \times 2}(k) = \sum_{[i,j,p] \in S_F(k)} \overline{\alpha}_{i,j,p}^{PDCCH}(k) f_{M \times N \times 2}(i,j,p)$$

where $$\overline{\alpha}_{i,j,p}^{PDCCH}(k) = \max_{ueRxAnt} \left( \sum_{[i,j,p] \in S_F(k)} |\overline{\alpha}_{i,j,p}(ueRxAnt,k)|^2 \right)$$

and $S_F(k)$ represents a set of orthonormal functions which capture most of the useful signal information at time k. The wideband reconstructed channel matrix for PDCCH, $H_{PDCCH}(k)$, can then be used to compute $W_{PDCCH}(k)$, as described above.

In some embodiments, the base station 102 estimates a SINR for the PDCCH (step 320). The estimated SINR for PDCCH is denoted herein as $\gamma_c$. The base station 102 then precodes DCI to be transmitted on the PDCCH with the beamforming weights $W_{PDCCH}$ and a modulation and coding scheme that is based on the estimated SINR $\gamma_c$ (step 322).

The PDSCH transmission and the PDCCH transmission are transmitted by the base station 102 via the antenna system (i.e., the AAS in this example) of the base station 102 (step 324). The process is then repeated for the next time instant k.

Note that the process of FIG. 3 is only an example. Other variations will be appreciated by one of skill in the art. For example, in one alternative embodiment, the filtering of steps 304 and 314 is performed after step 300 and before step 302 such that a filtered estimate of the spatial channel matrix is projected onto the set of spatial orthonormal functions. From there, the process proceeds as described above.

In a second embodiment, in order to compute the beamforming weights for, e.g., PDSCH and PDCCH, multiple sets of spatial orthonormal functions are constructed, each with spatial orthonormal functions of different beamwidths ranging from small to large. The smallest and the largest beamwidths are decided by the antenna system configuration. Normally the largest beamwidth corresponds to the beamwidth of a single subarray. The smallest beamwidth is decided based on the number of subarrays in horizontal (and also vertical direction if it is Uniform Rectangular Array (URA)). For example, if the subarray has 3 dB beamwidth of 65 degrees and there are 8 subarrays in the horizontal direction, then the smallest beamwidth is roughly 65/8 and the largest beamwidth is 65 degrees. The smallest beamwidth that can be achieved may sometimes also depends on the electrical distance between subarrays. From these sets of spatial orthonormal functions, a spatial orthonormal function is selected based on some criterions described below and used to generate the beamforming weights used by a respective precoder.

According to this embodiment, the beamforming weights W(subBand, k) for a given subband and time instant k (which may also be referred to as a precoding vector) can be set to or otherwise computed or determined from one of the spatial orthonormal functions from the l-th set of spatial orthonormal functions $\{f^l\}$ having the largest $|\alpha_{i,j,p}|^2$. Note that $\{f^l\}$ denotes the l-th set of spatial orthonormal functions, i.e., $\{f^l\} = f_{M \times N \times 2}^l$ (i,j,p) for i=0,1, ..., M-1, j=0,1, ..., N-1, and p=0,1. Thus, in other words, $\{f^l\} = \{f_{M \times N \times 2}^l (0,0,0), f_{M \times N \times 2}^l (0,0,1), \ldots, f_{M \times N \times 2}^l (M-1, N-1, 1)\}$. The sets of spatial orthonormal functions $\{f^l\}$ for l=0,1, ... L-1 differ by the 3 dB beamwidth and/or AoD of their beam space manifold. Here, L is the number of configured spatial orthonormal function sets.

In the same manner as described above, for each l-th set of spatial orthonormal functions $\{f^l\}$ of the L available sets, the coefficients $\alpha_{i,j,p}^l$ of the spatial orthonormal functions in the set are computed by projecting the channel matrix $H_{M \times N \times 2}$ onto the l-th set of spatial orthonormal functions $\{f^l\}$. Therefore, for each l-th set of spatial orthonormal functions $\{f^l\}$, the coefficients $\alpha_{i,j,p}^l$ of the spatial orthonormal functions in the set can be computed as:

$$\alpha_{i,j,p}^l(\text{subBand,ueRxAnt},k) = (H_{M \times N \times 2}(\text{subBand, ueRxAnt},k), f_{M \times N \times 2}^l(i,j,p)) \quad \text{Eqn. (8)}$$

where (x,y) represents the inner product of vectors x and y. For each l-th set of spatial orthonormal functions, the following condition is satisfied:

$$\hat{H}_{M \times N \times 2}(\text{subBand, ueRxAnt}, k) = \sum_{[i,j,p] \in S^l(k)} \overline{\alpha}_{i,j,p}^l(\text{subBand, ueRxAnt}, k) f_{M \times N \times 2}^l(i,j,p) \quad \text{Eqn. (9)}$$

where $\overline{\alpha}_{i,j,p}^l$ is the filtered version of $\alpha_{i,j,p}^l$ (filtered in time and optionally in frequency domain) as described above and $S^l(k)$ represents a set of orthonormal functions which capture most of the useful signal information at time k for the reconstructed channel matrix for the l-th set of spatial orthonormal functions.

For each subband, the set of orthonormal functions $\{f^l\}$ corresponding to the smallest $S^l(k)$ is selected as an optimal set of spatial orthonormal functions $\{f^{opt,subBand}\}$ for that subband.

For example, the optimal set of spatial orthonormal functions $\{f^{opt,subBand}\}$ for a subband is one which can satisfy any one or any combination of the following criteria:

Number of orthonormal functions or beams within the one set defined by the filtered set of coefficients that contains useful information (signal) less than a predefined or preconfigured threshold number of beams $L_{min}$:

$$S^l(k) < L_{min}$$

Signal to Leakage ratio $\Gamma_k(\text{subBand})$ above a predefined or preconfigured threshold $\Gamma_{th}$:

$$\Gamma_k(\text{subBand}) = \frac{D_p(\text{subBand}, k)}{I_p(\text{subBand}, k)} > \Gamma_{th}$$

where $$D_p(\text{subBand}, k) = \sum_{ueRxAnt} \left\| \hat{H}_{M \times N}(\text{subBand, ueRxAnt}, k) \right\|^2$$

and $$I_p(\text{subBand}, k) = \sum_{ueRxAnt} \left\| \hat{H}_{M \times N \times 2}(\text{subBand, ueRxAnt}, k) - \hat{H}_{M \times N}(\text{subBand, ueRxAnt}, k) \right\|^2$$

The average radiated power $\overline{I}_p$ (subBand, k) and maximum radiated power $I_{P\_Max}$(subBand, k) in other beams should be less than predefined or preconfigured limits $I_{P\text{-}Avg}$ and $I_{P\text{-}max}$, respectively.

$$\overline{I}_P(subBand, k) < I_{P\text{-}Avg}$$

and $$I_{P\_Max}(subBand, k) < I_{P\text{-}Max}$$

$$\overline{I}_P(subBand, k) = \text{Average}\left(\sum_{\{i,j,p\} \notin S^f(k)} \sum_{ueRxAnt} |\overline{\alpha}_{ijp}^f(subBand, ueRxAnt, k)|^2\right)$$

$$I_{P\_Max}(subBand, k) = \max_{\{i,j,p\} \notin S^f(k)} \sum_{ueRxAnt} |\overline{\alpha}_{ijp}^f(subBand, ueRxAnt, k)|^2$$

Note that some of the criteria above are for each subband. In some other embodiments, these criteria may be wideband criteria.

For each subband, the beamforming weight W(subBand, k) at time instant k is computed based on the best spatial orthonormal function from the optimal set of spatial orthonormal functions $\{f^{opt,subBand}\}$ for the subband. The "best" spatial orthonormal function from the optimal set of spatial orthonormal functions $\{f^{opt,subBand}\}$ for the subband is the spatial orthonormal function from the set having the largest $|\alpha_{i,j,p}|^2$. More specifically, in some embodiments, the beamforming weight W(subBand, k) is computed as:

$$W(subBand,k) = \zeta f_{M \times N \times 2}^{opt,subBand}(i_o, j_o, p_o)$$

where $(i_o, j_o, p_o)$ represents the index of the best spatial orthonormal function in the optimal set of spatial orthonormal functions $\{f^{opt,subBand}\}$ for the subband, and c is a scaling factor that is determined such that the total transmit power is within the limits of an allowed transmit power range for the base station 102.

Figure 4A:
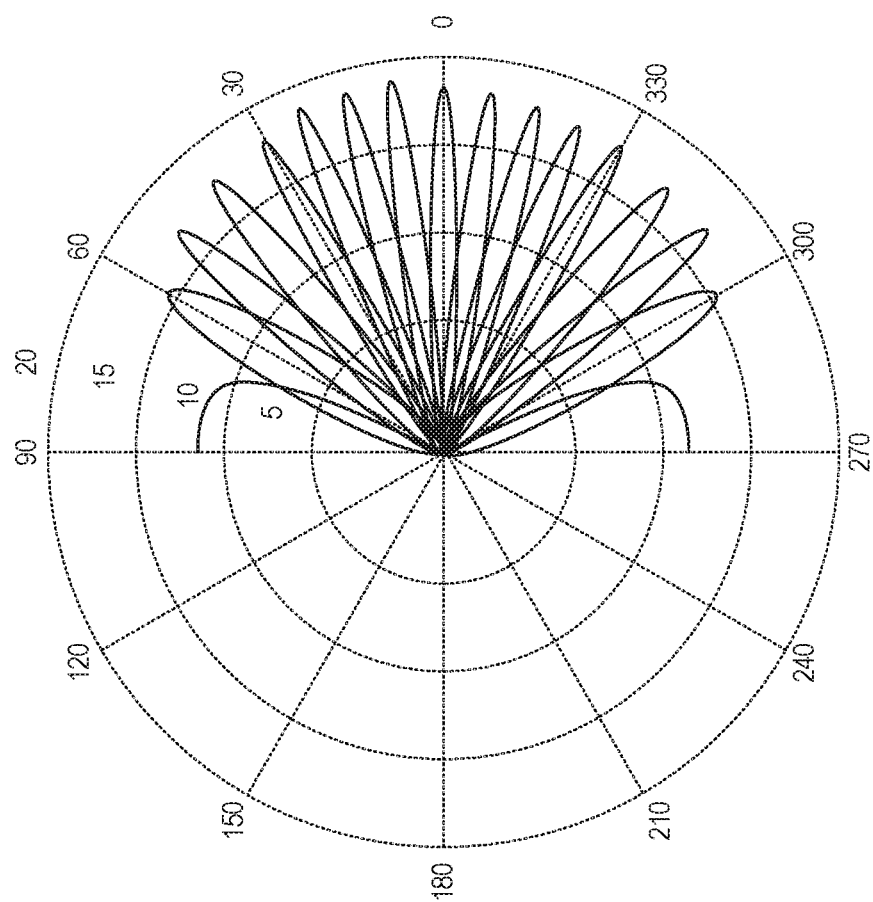
FIGS. 4A through 4G represent beams corresponding to multiple sets of different spatial orthonormal functions.
Figure 4C:
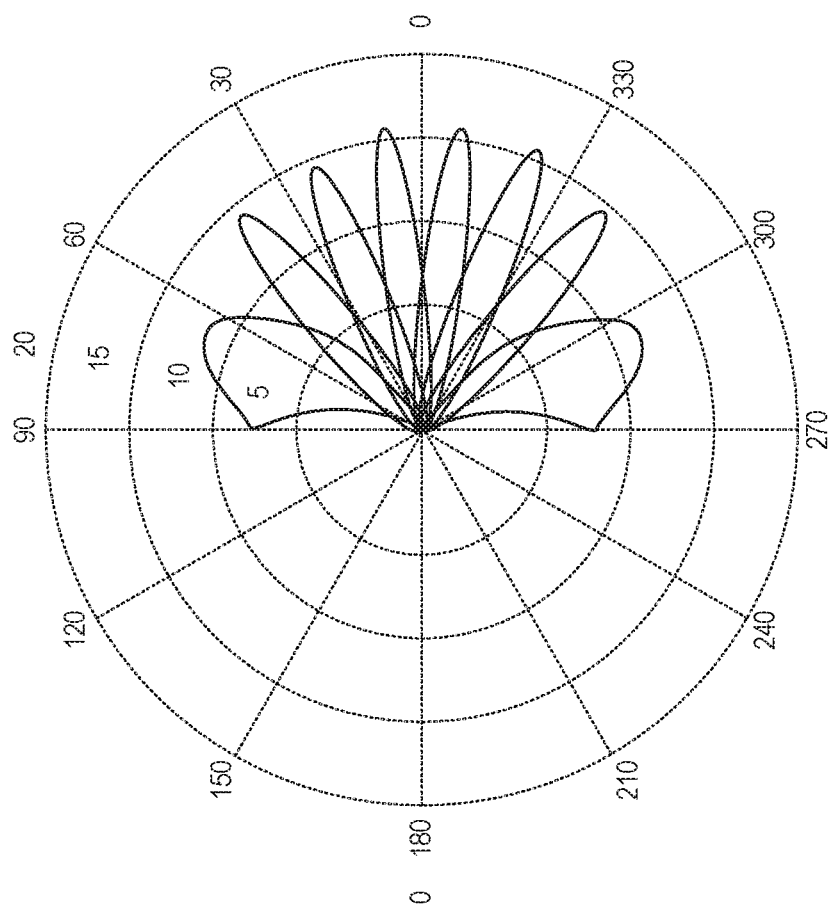
Figure 4B:
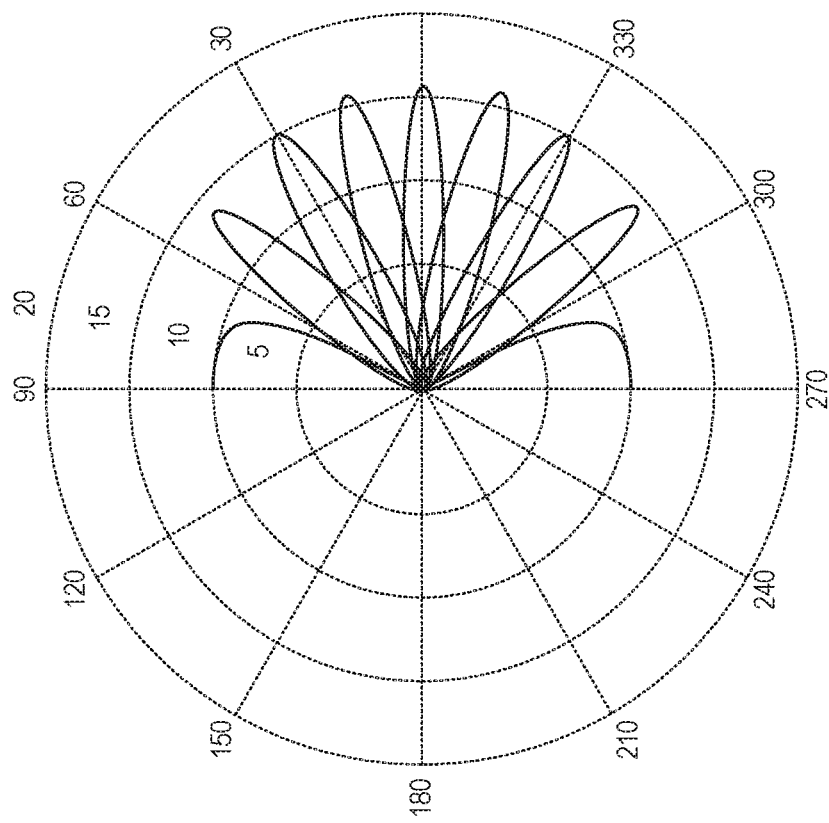
Figure 4E:
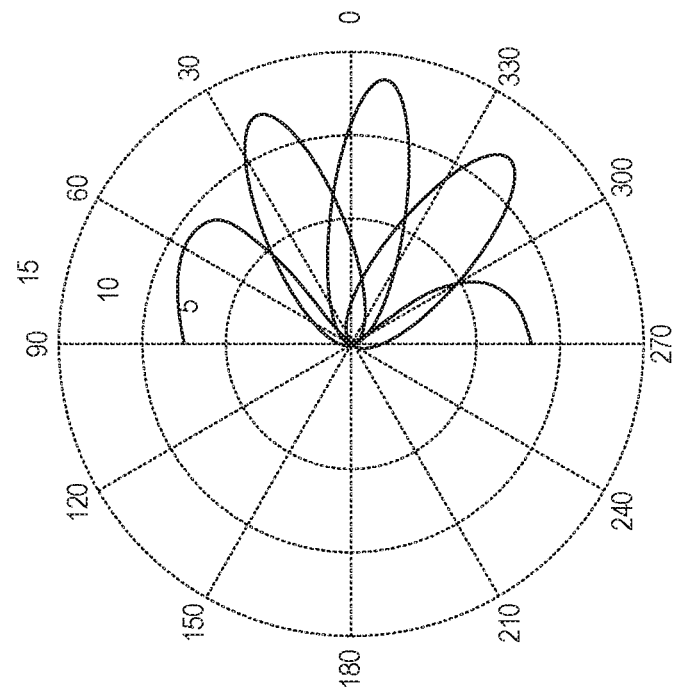
Figure 4D:
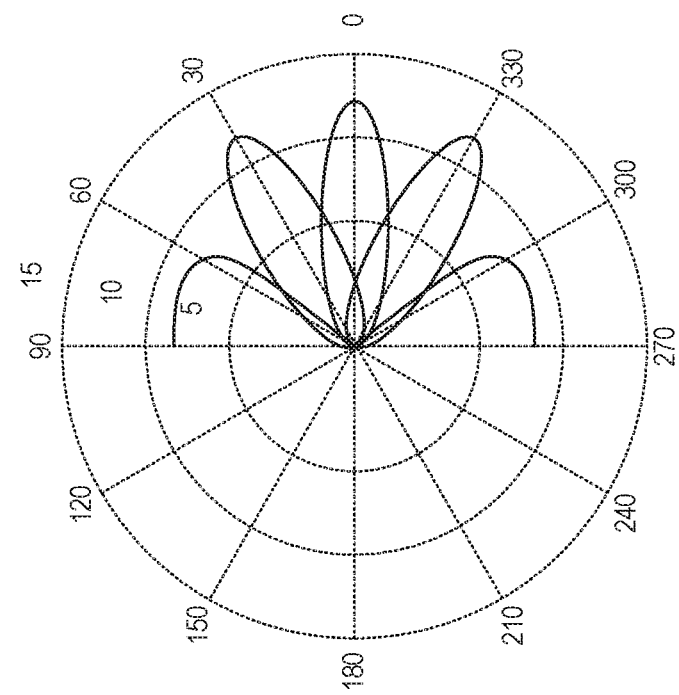
Figure 4G:
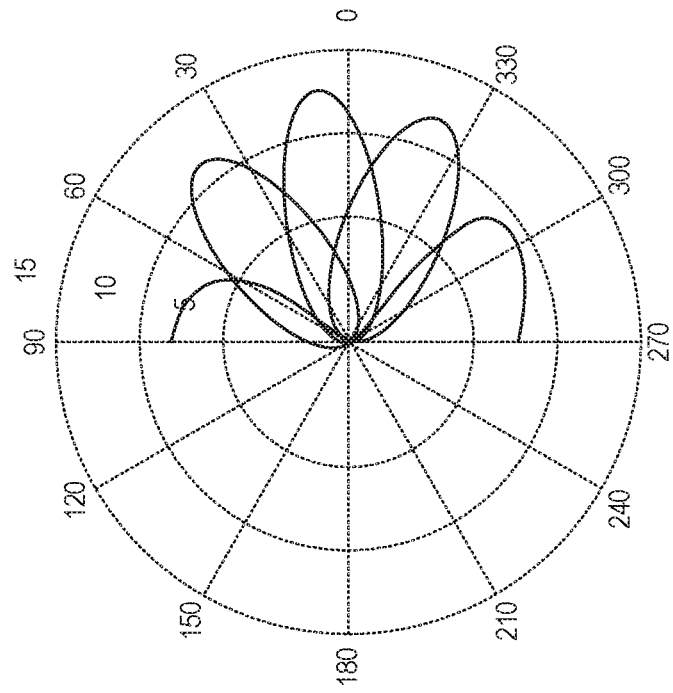
Figure 4F:
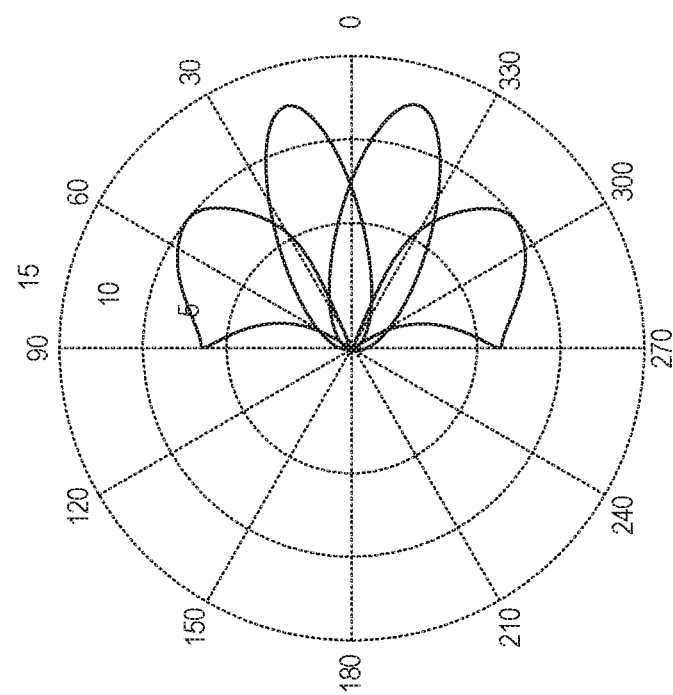

For example, for a Uniform Linear Array (ULA) of size 16×1, seven sets of spatial orthonormal functions gives varying 3 decibel (dB) beamwidth, as shown in FIGS. 4A through 4G. In particular, FIG. 4A illustrates set 0 having a smallest 3 dB beamwidth (DFT beams on $ULAL_{Array}=16$; $L_{DFT}=16$), FIGS. 4B and 4C illustrate sets 1 and 2 each having the next-to-smallest 3 dB beamwidth but different AoDs (DFT beams on a ULA $L_{Array}=16$; $L_{DFT}=8$), and FIGS. 4D through 4G illustrates sets 3 through 6 each having a largest 3 dB beamwidth but different AoDs (DFT beams on a ULA $L_{Array}=16$; $L_{DFT}=4$). Note that the details of coefficient derivation for these orthogonal sets for the same ULA length are provided below.

Figure 5:
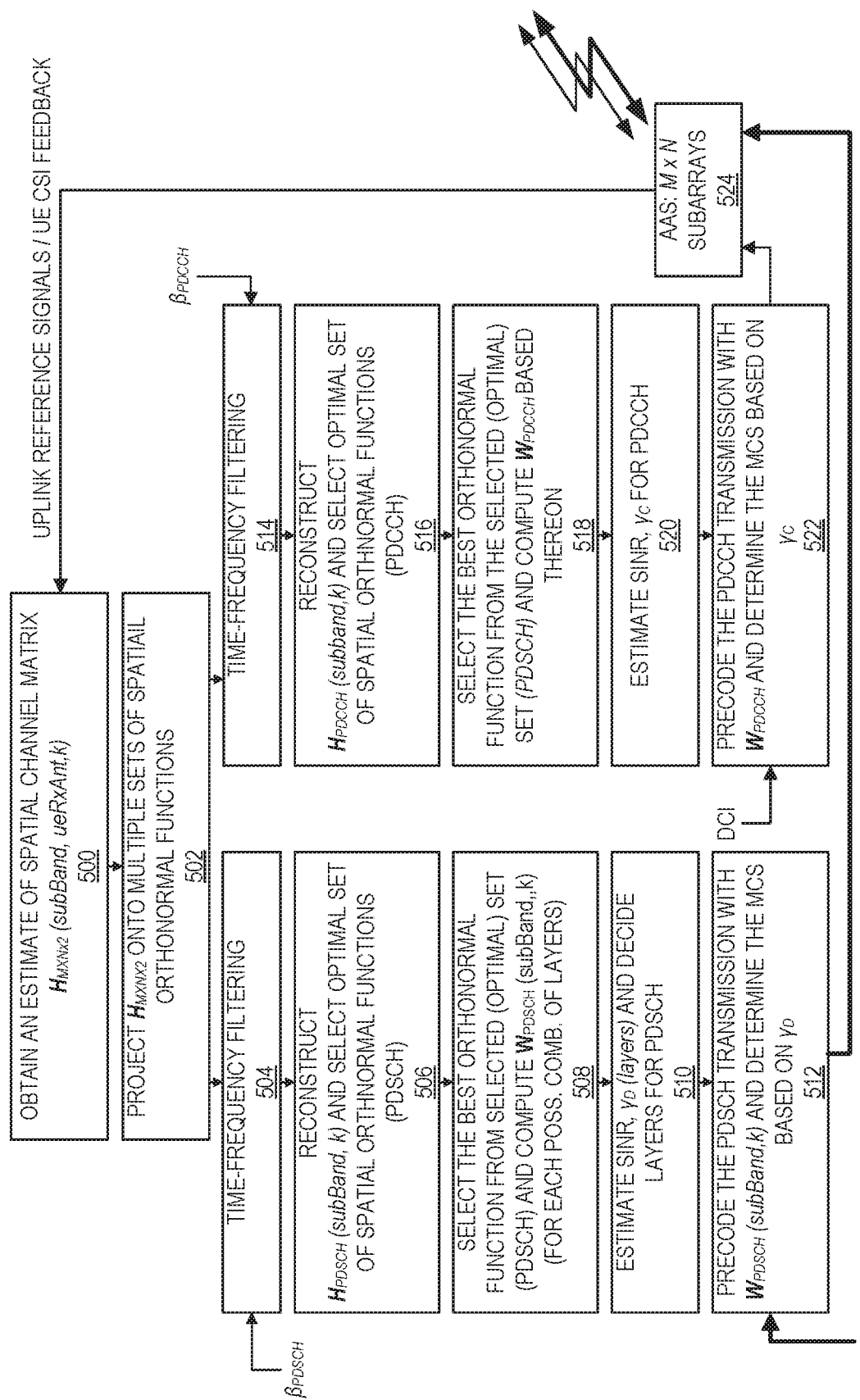
FIG. 5 illustrates the process of FIG. 2 in more detail in accordance with a second embodiment of the present disclosure.

FIG. 5 illustrates the process of FIG. 2 in more detail in accordance with the second embodiment of the present disclosure described above. As illustrated, at a time instant k, the base station 102 obtains estimates of a spatial channel matrix $H_{M \times N \times 2}$ (subBand, ueRxAnt, k) for a wireless channel from the base station 102 to a particular wireless device 112 for two or more subbands of the full downlink frequency band for one or more receive antennas of the wireless device 112 (step 500). Each estimate of the spatial channel matrix $H_{M \times N \times 2}$ (subBand, ueRxAnt, k) may be obtained using any desired technique. However, the estimates of the spatial channel matrix $H_{M \times N \times 2}$ (subBand, ueRxAnt, k) are obtained from the same feedback from the wireless device 112 for both physical downlink channels. This feedback is, in some embodiments, feedback provided by the wireless device 112 for PDSCH transmission. Thus, the feedback for the PDSCH transmission is used by the base station 102 to generate weights (referred to herein as beamforming weights) for both the PDSCH precoder and the PDCCH precoder. As a result, as discussed below, separate beamforming weights are computed for the PDSCH precoder and the PDCCH precoder without increasing the feedback overhead.

In this embodiment, in order to compute the beamforming weights for the PDSCH and PDCCH transmissions, the base station 102 first projects each of the estimates of the spatial channel matrix $H_{M \times N \times 2}$(subBand, ueRxAnt, k) at time instant k onto the multiple sets of spatial orthonormal functions $\{f^l\}$ in accordance with Eqn. (1) and Eqn. (8), thereby obtaining multiple sets of coefficients $\alpha_{ijp}^l$, one set for each combination of subBand, ueRxAnt, and l for the current time instant k (step 502). Thus, the base station 102 produces a separate set of coefficients $\alpha_{i,j,p}^l$ (subBand, ueRxAnt, k) for the time instant k for each subband for each receive antenna of the wireless device 112 for each of the multiple sets of spatial orthonormal functions $\{f^l\}$.

For PDSCH, the base station 102 performs filtering of the coefficients $\alpha_{i,j,p}^l$ (subBand, ueRxAnt, k) in time and optionally frequency based on a respective filtering parameter $\beta_{PDSCH}$, as described above, e.g., with respect to Eqn. (5) and Eqn. (6) (step 504). Note that filtering in time takes into account coefficients $\alpha_{i,j,p}^l$ (subBand, ueRxAnt, k) computed for a previous time instant(s). The result of the filtering is filtered coefficients $\overline{\alpha}_{i,j,p}^{l,PDSCH}$ (subBand, ueRxAnt, k). Using the filtered coefficients $\overline{\alpha}_{i,j,p}^{l,PDSCH}$ (subBand, ueRxAnt, k), the base station 102 recontructs a channel matrix $H_{PDSCH}$(subBand, k) for PDSCH for time instant k for each subband for each of the L sets in accordance with Eqn. (9) (step 506). Thus, for each l-th set of spatial orthonormal functions $\{f^l\}$ at time instant k, the reconstructed channel matrix $H_{PDSCH}$(subBand, k) for PDSCH for each particular subband for the l-th set of spatial orthonormal functions $\{f^l\}$ can be written as:

$$H_{PDSCH}(subBand, k) = \begin{bmatrix} H_{PDSCH}(subBand, 0, k) \\ H_{PDSCH}(subBand, 1, k) \\ \ldots \\ H_{PDSCH}(subBand, N_{ueRxAnt} - 1, k) \end{bmatrix}$$

where $$H_{PDSCH}(subBand, ueRxAnt, k) = \hat{H}_{M \times N \times 2}(subBand, ueRxAnt, k) = \sum_{\{i,j,p\} \in S^f(k)} \overline{\alpha}_{i,j,p}^{l,PDSCH}(subBand, ueRxAnt, k) f_{M \times N \times 2}^l(i, j, p)$$

where $H_{PDSCH}$(subBand, ueRxAnt, k) is a reconstructed channel matrix for PDSCH for a particular subband and wireless device receive antenna and $\hat{H}_{M \times N \times 2}$(subBand, ueRxAnt, k) is defined in Eqn. (9).

Using the reconstructed channel matrices $H_{PDSCH}$(subBand, k) for PDSCH, the base station 102 also selects, for each subband, the optimal set of spatial orthonormal functions $\{f^{opt,subBand}\}$ from the L sets of spatial orthonormal functions for that subband (step 506). More specifically, for each subband, the set of orthonormal functions $\{f^l\}$ corresponding to the smallest $S^l(k)$ is selected the optimal set of spatial orthonormal functions $\{f^{opt,subBand}\}$ for that subband, where $S^l(k)$ represents a set of orthonormal functions (i.e., a subset of the set of spatial orthonormal functions $\{f^l\}$) that captures most of the useful signal power at time k for that subband. Additional details regarding the selection of the optimal set of spatial orthonormal functions $\{f^{opt,subBand}\}$ for a subband are provided above and not repeated here.

For each subband, the base station 102 selects the "best" spatial orthonormal function from the optimal set of spatial orthonormal functions $\{f^{opt,subBand}\}$ for the subband (step 508). As discussed above, the "best" spatial orthonormal function from the optimal set of spatial orthonormal functions $\{f^{opt,subBand}\}$ for the subband is the spatial orthonormal function from the set having the largest $|\alpha_{i,j,p}|^2$.

Further, for each subband, the base station 102 computes the beamforming weight W(subBand, k) based on the best spatial orthonormal function from the optimal set of spatial orthonormal functions $\{f^{opt,subBand}\}$ for the subband (step 508). More specifically, in some embodiments, the beamforming weight W(subBand, k) is computed as described above with respect to step 308. In one example alternative embodiment, the beamforming weight W(subBand, k) is computed as:

$$W_{PDSCH}(\text{subBand},k) = \zeta f_{M \times N \times 2}^{opt,subBand}(i_o, j_o, p_o)$$

where $(i_o, j_o, p_o)$ represents the index of the spatial orthonormal function in the optimal set of spatial orthonormal functions $\{f^{opt,subBand}\}$ for the subband, and $\zeta$ is a scaling factor that is determined such that the total transmit power is within the limits of an allowed transmit power range for the base station 102.

As discussed above, in some embodiments, for PDSCH, the number of transmission layers $N_{layer}$ can be any number less than or equal the number of wireless device receive antennas $N_{ueRxAnt}$. Thus, in some embodiments, the base station 102 computes hypothesized beamforming weights $W_{PDSCH}^{Hyp}(\text{subBand}, \text{Hyp}, k, N_{layer})$ for each of a number of hypothesized layer combinations for each possible value of $N_{layer}$. As described below with respect to step 510, the hypothesized beamforming weights $W_{PDSCH}^{Hyp}$ (subBand, k, $N_{layer}$) associated with one combination of transmit layers (e.g., the best combination of transmit layers) for one value of $N_{layer}$ (e.g., the best value of $N_{layer}$) is selected as the $W_{PDSCH}$(subBand, k) for PDSCH for that subband.

In some embodiments, the base station 102 estimates a SINR for each of the different numbers of transmit layers and decides, or selects, the best combination of layers, i.e. best Hyp for a given $N_{layers}$) to be used for the PDSCH transmission, as described above with resect to step 204 (step 510). For each time instant k and each subband, the base station 102 precodes a number of information bits to be transmitted on the PDSCH with the respective beamforming weights $W_{PDSDH}$(subBand, Hyp, k, $N_{layers}$) for the selected number and combination of layers and determines a modulation and coding scheme based on the estimated SINR $\gamma_D$ for the selected combination of layers, Hyp, as described above with respect to step 206 (step 512). 15

For the PDCCH, the base station 102 performs filtering of the sets of coefficients $\alpha_{i,j,p}^l$ (subBand, ueRxAnt, k) in time and optionally frequency based on a respective filtering parameter $\beta_{PDCCH}$, as described above, e.g., with respect to Eqn. (5) and Eqn. (6) (step 514). The result of the filtering is filtered coefficients $\alpha_{i,j,p}^{l,PDCCH}$ (subBand, ueRxAnt, k). Using the filtered coefficients $\overline{\alpha}_{i,j,p}^{l,PDCCH}$ (subBand, ueRxAnt, k), the base station 102 recontructs a channel matrix for PDCCH for time instant k for each of the L sets in accordance with Eqn. (9) (step 516). Thus, for each l-th set of spatial orthonormal functions $\{f^l\}$ at time instant k, the reconstructed channel matrix for PDCCH for the l-th set of spatial orthonormal functions $\{f^l\}$ for each particular subband can be written as:

$$H_{PDCCH}(\text{subBand}, k) = \begin{bmatrix} H_{PDCCH}(\text{subBand}, 0, k) \\ H_{PDCCH}(\text{subBand}, 1, k) \\ \ldots \\ H_{PDCCH}(\text{subBand}, N_{ueRxAnt} - 1, k) \end{bmatrix}$$

where $$H_{PDCCH}(\text{subBand}, ueRxAnt, k) = \hat{H}_{M \times N \times 2}(\text{subBand}, ueRxAnt, k) = \sum_{\{i,j,p\} \in S^l(k)} \overline{\alpha}_{i,j,p}^{l,PDCCH}(\text{subBand}, ueRxAnt, k) f_{M \times N \times 2}(i, j, p)$$

where $H_{PDCCH}$(subBand, ueRxAnt, k) is a reconstructed channel matrix for PDCCH for a particular subband and wireless device receive antenna and $\hat{H}_{M \times N \times 2}$(subBand, ueRxAnt, k) is defined in Eqn (9).

Using the reconstructed channel matrices $H_{PDCCH}$(subband,k) for PDCCH, the base station 102 selects, for each subband, the optimal set of spatial orthonormal functions $\{f^{opt,subBand}\}$ for PDCCH from the L sets of spatial orthonormal functions (step 516). More specifically, for each subband, the set of orthonormal functions $\{f^l\}$ corresponding to the smallest $S^l(k)$ is selected the optimal set of spatial orthonormal functions $\{f^{opt,subBand}\}$ for that subband, where $S^l(k)$ represents a set of orthonormal functions (i.e., a subset of the set of spatial orthonormal functions $\{f^l\}$) that captures most of the useful signal power at time k for that subband. Additional details regarding the selection of the optimal set of spatial orthonormal functions $\{f^{opt,subBand}\}$ for a subband are provided above and not repeated here.

For each subband, the base station 102 selects the "best" spatial orthonormal function from the optimal set of spatial orthonormal functions $\{f^{opt,subBand}\}$ for the subband (step 518). As discussed above, the "best" spatial orthonormal function from the optimal set of spatial orthonormal functions $\{f^{opt,subBand}\}$ for the subband is the spatial orthonormal function from the set having the largest $|\alpha_{i,j,p}|^2$.

Further, the base station 102 computes the beamforming weight $W_{PDCCH}$(subband, k) for PDCCH based on the best spatial orthonormal function from the optimal set of spatial orthonormal functions $\{f^{opt,subBand}\}$ for the subband (step 518). More specifically, in some embodiments, the beamforming weight $W_{PDCCH}$(subband,k) is computed as:

$$W_{PDCCH}(\text{subband},k) = \zeta f_{M \times N \times 2}^{opt,subBand}(i_o, j_o, p_o)$$

where $(i_o, j_o, p_o)$ represents the index of the spatial orthonormal function in the optimal set of spatial orthonormal functions $\{f^{opt,subBand}\}$ for the subband, and is a scaling factor that is determined such that the total transmit power is within the limits of an allowed transmit power range for the base station 102.

In some embodiments, the base station 102 estimates a SINR for the PDCCH (step 520). The estimated SINR for PDCCH is denoted herein as $\gamma_c$. The base station 102 then precodes DCI to be transmitted on the PDCCH with the beamforming weights $W_{PDCCH}$(subband, k) for the respective subbands and determines a modulation and coding scheme based on the estimated SINR $\gamma_c$ (step 522). Note that while the beamforming weights for PDCCH are computed above for each subband, in some alternative embodiments, the beamforming weights for PDCCH are computed as a wideband set of weights by, e.g., averaging $H_{PDCCH}$(subband,k) across all subbands prior to selecting the optimal set of spatial orthonormal functions and the best orthonormal function from the optimal set.

The PDSCH transmission and the PDCCH transmission are transmitted by the base station 102 via the antenna system (i.e., the AAS in this example) of the base station 102 (step 524). The process is then repeated for the next time instant k.

Note that the process of FIG. 5 is only an example. Other variations will be appreciated by one of skill in the art. For example, in one alternative embodiment, the filtering of steps 504 and 514 is performed after step 500 and before step 502 such a filtered estimate of the spatial channel matrix is projected onto the set of spatial orthonormal functions. From there, the process proceeds as described above.

In a third embodiment, in order to compute the beamforming weights for, e.g., PDSCH and PDCCH, a desired spatial orthonormal function is adaptively constructed by determining (e.g., measuring) a required beamwidth (e.g., a required 3 dB beamwidth) and AoD from a base set of spatial orthonormal functions.

In one embodiment, the base set of spatial orthonormal functions is a set of orthonormal functions that corresponds to a smallest 3 dB beamwidth. As an example, looking at the example sets of orthonormal functions represented in FIGS. 4A through 4G, the set of orthonormal functions represented in FIG. 4A have the smallest 3 dB beamwidth and, as such, are used as the base set of spatial orthonormal functions in this embodiment. The base set of orthonormal functions are denoted as $\{f^o\}$. The channel matrix $H_{M \times N \times 2}$ (subBand, ueRxAnt, k) is projected onto the base set of orthonormal functions are denoted as $\{f^o\}$ to thereby compute the respective coefficients $\alpha_{i,j,p}$(subBand, ueRxAnt, k). The coefficients $\alpha_{i,j,p}$(subBand, ueRxAnt, k) for the base set of orthonormal functions are denoted as $\{f^o\}$ are denoted herein as $\alpha_{i,j,p}^{smallestBW}$(subBand, ueRxAnt, k). As discussed above, the coefficents $\alpha_{i,j,p}^{smallestBW}$(subBand, ueRxAnt, k) are filtered to provide respective filtered coefficients $\overline{\alpha}_{i,j,p}^{smallest\ BW}$(subBand, ueRxAnt, k). A required Beamwidth (BW) and AoD are computed from $\overline{\alpha}_{i,j,p}^{smallest\ BW}$(subBand, ueRxAnt, k). More specifically, the required beamwidth is computed by determining which of the spatial orthonormal functions in the base set $\{f^o\}$ have nonzero magnitudes $|\alpha_{i,j,p}^{smallest\ BW}|^2$. The combined beamwidth of these spatial orthonormal functions from the base set $\{f^o\}$ that have nonzero magnitudes gives the required beamwidth. Further, as an example, a central AoD for the combined beamwidth can be used as the required AoD.

A desired set of spatial orthonormal functions (denoted $\{f^{opt,subBand}\}$) is then computed based on the required 3 dB beamwidth and AoD. A process for deriving this desired set of spatial orthonormal functions $\{f^{opt,subBand}\}$ is described below. The "best" spatial orthonormal function from the desired set of spatial orthonormal functions $\{f^{opt,subBand}\}$ is then selected and the beamforming weights are computed from this best spatial orthonormal function, as described above.

This process can be described mathematically as follows. As stated earlier, the coefficients $\alpha_{i,j,p}^{smallest\ BW}$ are computed by projecting $H_{M \times N \times 2}$ onto the base set of spatial orthonormal functions $\{f^o\}$, e.g., as follows:

$$\alpha_{i,j,p}^{smallest\ BW}(\text{subBand},\text{ueRxAnt},k) = (H_{M \times N \times 2}(\text{subBand},\text{ueRxAnt},k), f_{M \times N \times 2}^o(i,j,p)) \quad \text{Eqn. (10)}$$

For this base set of spatial orthonormal functions $\{f^o\}$, the following condition is satisfied:

$$\hat{H}_{M \times N \times 2}(\text{subBand}, \text{ueRxAnt}, k) = \sum_{(i,j,p) \in S^0(k)} \overline{\alpha}_{i,j,p}^{smallestBW}(\text{subBand}, \text{ueRxAnt}, k) f_{M \times N \times 2}^0(i, j, p) \quad \text{Eqn. (11)}$$

where $\overline{\alpha}_{i,j,p}^{smallest\ BW}$ is the filtered version of $\alpha_{i,j,p}^{smallest\ BW}$ (filtered in time and optionally in frequency domain) as defined above.

The AoD and beamwidth can be determined from $|\alpha_{i,j,p}^{smallest\ BW}(\text{subBand}, \text{ueRxAnt}, k)|^2$. Subsequently, an optimal (best) spatial orthonormal function $f_{M \times N \times 2}^{opt,subBand}(i_o, j_o, p_o)$ is determined for each subband, where this optimal spatial orthonormal function $f_{M \times N \times 2}^{opt,subBand}(i_o, j_o, p_o)$ satisfies the required beamwidth and AoD.

For each subband, the beamforming weights W(subBand, k) are computed based on the optimal spatial orthonormal function $f_{M \times N \times 2}^{opt,subBand}(i_o, j_o, p_o)$ for that subband, e.g., as follows:

$$W(\text{subBand},k) = \zeta f_{M \times N \times 2}^{opt,subBand}(i_o,j_o,p_o) \text{ for each subBand} \quad \text{Eqn. (12)}$$

where $\zeta$ is the scaling factor, which is determined such that the total transmit power is within the limits of the allowed transmit power range for the base station 102.

Figure 6:
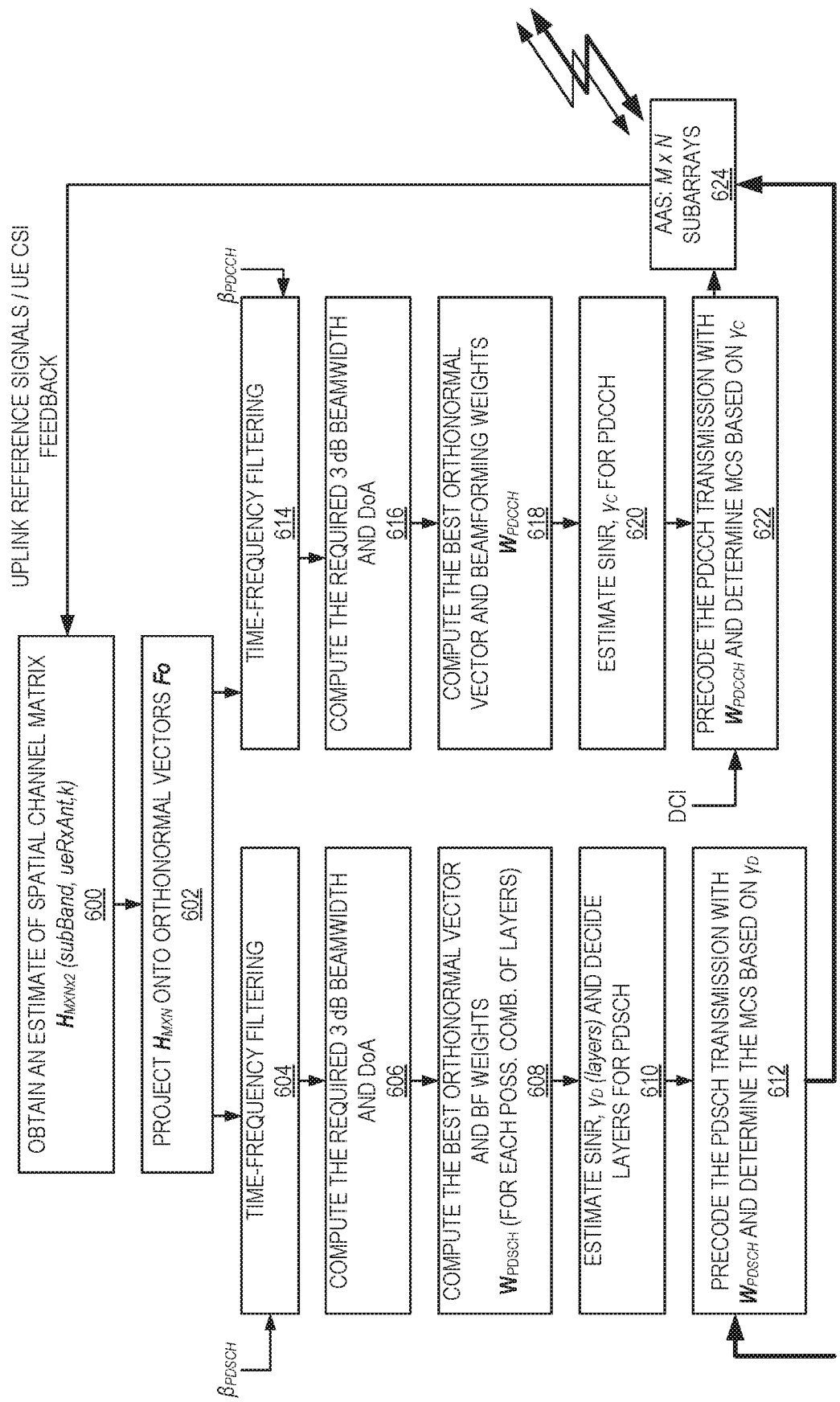
FIG. 6 illustrates the process of FIG. 2 in more detail in accordance with a third embodiment of the present disclosure.

FIG. 6 illustrates the process of FIG. 2 in more detail in accordance with the third embodiment of the present disclosure described above. As illustrated, at a time instant k, the base station 102 obtains estimates of a spatial channel matrix $H_{M \times N \times 2}$ (subBand, ueRxAnt, k) for a wireless channel from the base station 102 to a particular wireless device 112 for two or more subbands of the full downlink frequency band for one or more receive antennas of the wireless device 112 (step 600). Each estimate of the spatial channel matrix $H_{M \times N \times 2}$ (subBand, ueRxAnt, k) may be obtained using any desired technique. However, the estimates of the spatial channel matrix $H_{M \times N \times 2}$ (subBand, ueRxAnt, k) are obtained from the same feedback from the wireless device 112 for both physical downlink channels. This feedback is, in some embodiments, feedback provided by the wireless device 112 for PDSCH transmission. Thus, the feedback for the PDSCH transmission is used by the base station 102 to generate weights (referred to herein as beamforming weights) for both the PDSCH precoder and the PDCCH precoder. As a result, as discussed below, separate beamforming weights are computed for the PDSCH precoder and the PDCCH precoder without increasing the feedback overhead.

In this embodiment, in order to compute the beamforming weights for the PDSCH and PDCCH transmissions, the base station 102 first projects each of the estimates of the spatial channel matrix $H_{M \times N \times 2}$(subBand, ueRxAnt, k) at time instant k onto the base set of spatial orthonormal functions $\{f^o\}$ in accordance with Eqn. (1) and Eqn. (10) thereby obtaining multiple sets of coefficients $\alpha_{i,j,p}^{smallest\ BW}$, one set for each combination of subBand, ueRxAnt, k (step 602). Thus, steps 600 and 602 produce a separate set of coefficients $\alpha_{i,j,p}^{smallest\ BW}$(subBand, ueRxAnt, k) for the time instant k for each subband for each receive antenna of the wireless device 112.

For PDSCH, the base station 102 performs filtering of the multiple sets of coefficients $\alpha_{ijp}^{smallest\ BW}$(subBand, ueRxAnt, k) in time and optionally frequency based on a respective filtering parameter $\beta_{PDSCH}$ as described above, e.g., with respect to Eqn. (5) and Eqn. (6) (step 604). The result of the filtering is filtered coefficients $\overline{\alpha}_{i,j,p}^{smallestBW,PDSCH}$(subBand, ueRxAnt, k). Using the filtered coefficients $\overline{\alpha}_{i,j,p}^{smallestBW,PDSCH}$ (subBand, ueRxAnt, k), the base station 102 computes the required 3 dB beamwidth and AoD for PDSCH, as described above (step 606).

For each subband, using the computed 3 dB beamwidth and AoD for PDSCH for that subband, the base station 102 computes an optimal (best) spatial orthonormal function $f_{M \times N \times 2}^{opt,subBand}$ and computes beamforming weights for the PDSCH transmission ($W_{PDSCH}$(subBand, k)) based on the optimal spatial orthonormal function $f_{M \times N \times 2}^{opt,subBand}$ as described above (step 608).

As discussed above, in some embodiments, for PDSCH, the number of transmission layers $N_{layer}$ can be any number less than or equal to the number of wireless device receive antennas $N_{ueRxAnt}$. Thus, in some embodiments, the base station 102 may compute, in step 608, hypothesized beamforming weights $W_{PDSCH}^{Hyp}$ (subBand, k, $N_{layer}$) for each of a number of hypothesized layer combinations for each possible value of $N_{layer}$. Then, in step 610 discussed below, the hypothesized beamforming weights $W_{PDSCH}^{Hyp}$ (subBand, k, $N_{layer}$) associated with one combination of transmit layers (e.g., the best combination of transmit layers) for one value of $N_{layer}$ (e.g., the best value of $N_{layer}$) is selected as the $W_{PDSCH}$(subBand, k) for PDSCH for that subband.

In some embodiments, the base station 102 estimates a SINR for each of the different numbers of transmit layers and decides, or selects, the number and combination of layers to be used for the PDSCH transmission (step 610). The estimated SINR for the layers is denoted herein as $\gamma_D$ (layers). The base station 102 then precodes a number of information bits to be transmitted on the PDSCH with the beamforming weights $W_{PDSDH}$(subBand, k) associated with the number and combination of layer selected for the PDSCH transmission and a modulation and coding scheme that is based on the estimated SINR $\gamma_D$ of the layer(s) selected for the PDSCH transmission (step 612).

For the PDCCH, the base station 102 performs filtering of the coefficients $\alpha_{i,j,p}^{smallest\,BW}$(subBand, ueRxAnt, k) in time and optionally frequency based on a respective filtering parameter $\beta_{PDCCH}$ as described above, e.g., with respect to Eqn. (5) and Eqn. (6) (step 614). The result of the filtering is filtered coefficients $\overline{\alpha}_{i,j,p}^{smallest\,BW}$(subBand, ueRxAnt, k). Using the filtered coefficients $\overline{\alpha}_{i,j,p}^{PDCCH}$ (subBand, ueRxAnt, k), the base station 102 computes the required 3 dB beamwidth and AoD for PDCCH, as described above (step 616).

For each subband, using the computed 3 dB beamwidth and AoD for PDCCH for that subband, the base station 102 computes an optimal (best) spatial orthonormal function $f_{M \times N \times 2}^{opt,subBand}$ and computes beamforming weights for the PDCCH transmission ($W_{PDCCH}$(subBand, k)) based on the optimal spatial orthonormal function $f_{M \times N \times 2}^{opt,subBand}$ as described above (step 618).

In an alternative embodiment, $W_{PDCCH}$ is computed as a wideband set of beamforming weights. In way to do so is to average $\overline{\alpha}_{i,j,p}^{smallest\,BW}$ over all subbands, and then use the averaged $\overline{\alpha}_{i,j,p}^{smallest\,BW}$ to compute the required 3 dB beamwidth and AoD for PDCCH. Using the computed 3 dB beamwidth and AoD for PDCCH, the base station 102 computes an optimal (best) spatial orthonormal function $f_{M \times N \times 2}^{opt,subBand}$ and computes wideband beamforming weights for the PDCCH transmission ($W_{PDCCH}$(k)) based on the optimal spatial orthonormal function $f_{M \times N \times 2}^{opt}$ in the manner described above.

In some embodiments, the base station 102 estimates a SINR for the PDCCH (step 620). The estimated SINR for PDCCH is denoted herein as $\gamma_C$. The base station 102 then precodes DCI to be transmitted on the PDCCH with the beamforming weights $W_{PDCCH}$ and a modulation and coding scheme that is based on the estimated SINR $\gamma_C$ (step 622).

The PDSCH transmission and the PDCCH transmission are transmitted by the base station 102 via the antenna system (i.e., the AAS in this example) of the base station 102 (step 624). The process is then repeated for the next time instant k.

Note that the process of FIG. 6 is only an example. Other variations will be appreciated by one of skill in the art. For example, in one alternative embodiment, the filtering of steps 604 and 614 is performed after step 600 and before step 602 such a filtered estimate of the spatial channel matrix is projected onto the set of spatial orthonormal functions. From there, the process proceeds as described above.

Now, a discussion is provided of a procedure for deriving the optimal (best) spatial orthonormal function based on the required 3 dB beamwidth and AoD, e.g., as in steps 608 and 618. In the following description, the procedure presented in [1] is generalized to include any arbitrary DFT vector and array size. Furthermore, additional cover weights ($C_m(i)$) below) are derived to control the beamwidth and AoD of the resulting DFT beam.

The steering vector or antenna array manifold (also referred to as the beam space manifold), $\alpha^\Phi$, of a ULA of length $L_{Array}$ can be expressed as a row vector as follows:

$$\alpha^\Phi = \{\alpha^\Phi(0), \alpha^\Phi(1), \ldots, \alpha^\Phi(L_{Array}-1)\} \qquad \text{Eqn. (13)}$$

where the phase delay for the ith antenna element, $$\alpha^\Phi(i) = e^{-j\pi(L_{Array}-1)\mu} e^{j2\pi i \mu} \qquad \text{Eqn. (14)}$$

where $\mu = d_\lambda \sin \phi$, $d_\lambda$ is the inter-element distance normalized to the wavelength, and $\phi$ is the angle of departure.

A set of spatial orthonormal functions, $\{f_m', m \in [0, L_{DFT}]\}$ applied for the downlink transmission can be defined. Note that here m need not be an integer. For example, the mth spatial orthonormal function can be represented by a row vector as follows:

$$f_m' = \{f_m'(0), f_m'(1), \ldots, f_m'(L_{Array}-1)\} \qquad \text{Eqn. (15)}$$
where $f_m'(i) = f_m(i) C_m(i)$ $$f_m(i) = \qquad \text{Eqn. (16)}$$
$$e^{-j\pi(L_{Array}-1)\left(\frac{m}{L_{DFT}}\right)} e^{j2\pi i \left(\frac{m}{L_{DFT}}\right)} = e^{-j\pi(L_{Array}-1)(\eta-\mu)} e^{j2\pi i(\eta-\mu)}$$

$$C_m(i) = e^{j\pi(L_{Array}-L_{DFT})\eta} e^{-j2\pi\left\{\left\lfloor\frac{i}{L_{DFT}}\right\rfloor *L_{DFT}\right\}\eta} \qquad \text{Eqn. (17)}$$

where $\eta = (\mu + m/L_{DFT})$. $\lfloor x \rfloor$ represents the largest integer that is less than or equal to x.

Here, the length of the DFT, $L_{DFT}$, can be different from the length of the ULA; $L_{Array} = p^* L_{DFT}$, where here p is a scaling factor applied to $L_{DFT}$ to obtain $L_{Array}$. The value m can vary from 0 to $L_{DFT}$ and need not be an integer.

The beamspace manifold when the mth DFT spatial orthonormal function is applied, can be expressed as:

$$b_m(\phi) = a^\phi f_m'^T = \sum_{i=0}^{L_{Array}-1} a^\phi(i) f_m'(i) = \sum_{i=0}^{L_{Array}-1} a^\phi(i) f_m(i) C_m(i) \qquad \text{Eqn. (18)}$$

Substituting $\alpha^\Phi(i)$, $\mathfrak{f}_m(i)$ and $C_m(i)$ from Eqns. (14), (16), and (17), respectively:

$$b_m(\phi) = \qquad\qquad\qquad\qquad\qquad\qquad \text{Eqn. (19)}$$

$$e^{-j\pi(L_{Array}-1)\eta} e^{j\pi\{L_{Array}-L_{DPT}\}\eta} \sum_{i=0}^{L_{Array}-1} e^{-j2\pi\left\{\left\lfloor\frac{i}{L_{DFT}}\right\rfloor*L_{DFT}\right\}\eta} e^{j2\pi i \eta}$$

The summation over the $L_{Array}$ elements can be subdivided into $L_{Array}/L_{DFT}$ chunks of length $L_{DFT}$.

Substituting $$i = k*L_{DFT} + l;\ k = 0, 1, \ldots,\ \frac{L_{Array}}{L_{DFT}} - 1$$

and $l = 0, 1, \ldots, L_{DFT}-1$.

$$b_m(\phi) = e^{-j\pi(L_{Array}-1)\eta} e^{j\pi\{L_{Array}-L_{DFT}\}\eta} \qquad \text{Eqn. (20)}$$

$$\sum_{k=0}^{\frac{L_{Array}}{L_{DFT}}-1} e^{-j2\pi\{k*L_{DFT}\}\eta} e^{j2\pi(k*L_{DFT})\eta} \sum_{l=0}^{L_{DFT}-1} e^{j2\pi l\eta}$$

$$b_m(\phi) = e^{-j\pi(L_{Array}-1)\eta} e^{j\pi\{L_{Array}-L_{DFT}\}\eta} \sum_{k=0}^{\frac{L_{Array}}{L_{DFT}}-1} \sum_{l=0}^{L_{DFT}-1} e^{j2\pi l\eta} \quad \text{Eqn. (21)}$$

The $\sum_{l=0}^{L_{DFT}-1} e^{j2\pi l\eta}$ is the dirichlet kernal.

$$\sum_{l=0}^{L_{DFT}-1} e^{j2\pi l\eta} = \frac{e^{j\pi L_{DFT}\eta}}{e^{j\pi\eta}} \frac{\sin(\pi L_{DFT}\eta)}{\sin(\pi\eta)} \qquad \text{Eqn. (22)}$$

Substituting Eqn. (22) into Eqn. (21) results in to the following simplification:

$$b_m(\phi) = \qquad\qquad\qquad\qquad\qquad\qquad \text{Eqn. (23)}$$

$$\frac{L_{Array}}{L_{DFT}} e^{-j\pi(L_{Array}-1)\eta} e^{j\pi\{L_{Array}-L_{DFT}\}\eta} \frac{e^{j\pi L_{DFT}\eta}}{e^{j\pi\eta}} \frac{\sin(\pi L_{DFT}\eta)}{\sin(\pi\eta)}$$

The above equation can be further simplified as follows:

$$b_m(\phi) = \frac{L_{Array}}{L_{DFT}} \frac{\sin(\pi L_{DFT}\eta)}{\sin(\pi\eta)} \qquad \text{Eqn. (24)}$$

From Eqn. (24), the maximum beam gain for the mth beam occurs when:

$$L_{DFT}d_\lambda \sin\phi + m = 0$$

The zero-crossings occur when the following conditions occur:

$$L_{DFT}d_\lambda \sin 0 + m = \pm 1, \pm 2, \ldots$$

Beamwidth 3 dB can be measured to satisfy: $\sin(\pi L_{DFT}\eta) = 0.5\sin(\pi\eta)$.

Figure 7:
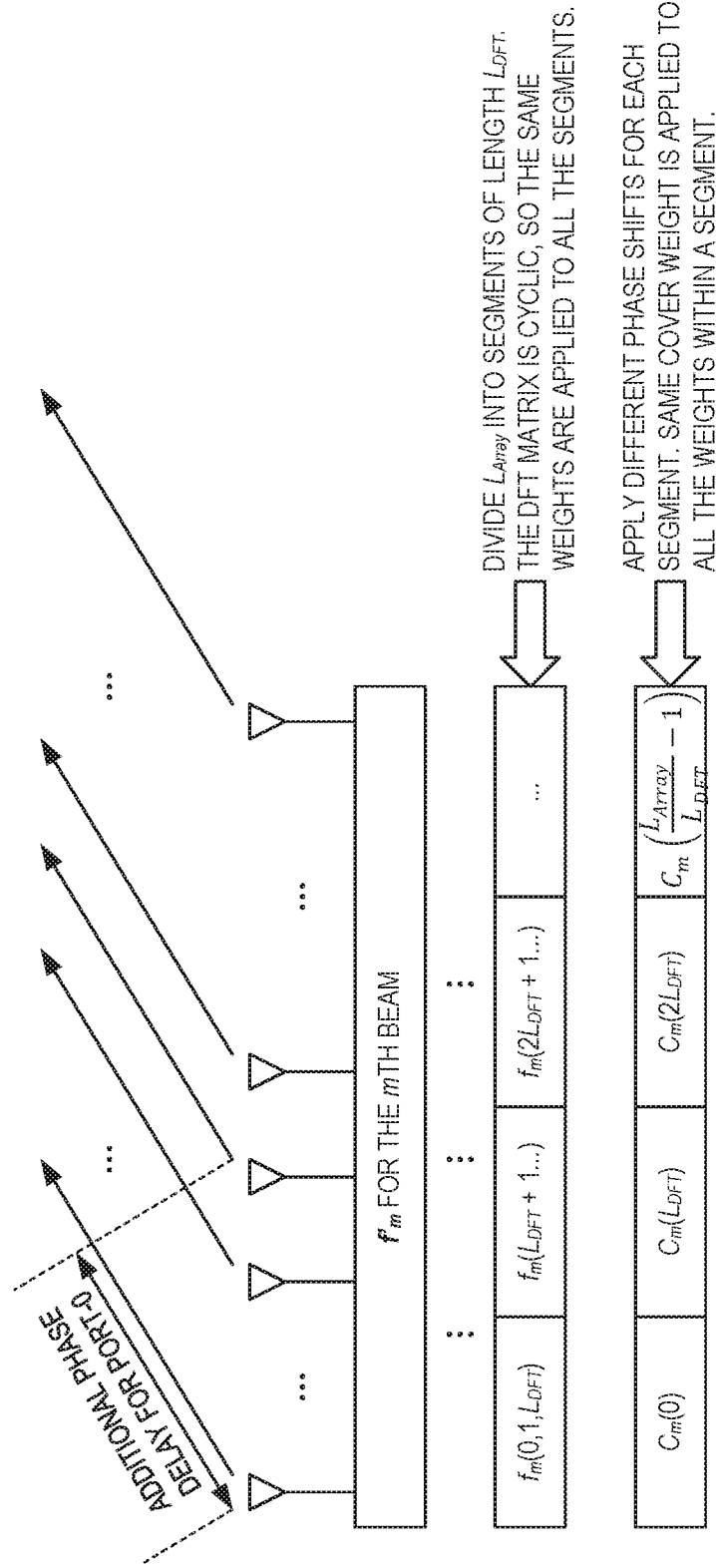
FIG. 7 depicts the interpretation of the cover weight computation.

FIG. 7 depicts the interpretation of the cover weight computation. As illustrated in FIG. 7 and described above with respect to Eqn. (15), the mth beamforming weights can be represented by a row vector $$\mathfrak{f}_m{}' = \{\mathfrak{f}_m{}'(0), \mathfrak{f}_m{}'(1)) \quad \cdot \quad \cdot \quad \cdot \quad ,\mathfrak{f}_m{}'(L_{Array}-1)\},$$
where $\mathfrak{f}_m{}'(i) = \mathfrak{f}_m(i)C_m(i)$.

Figure 8:
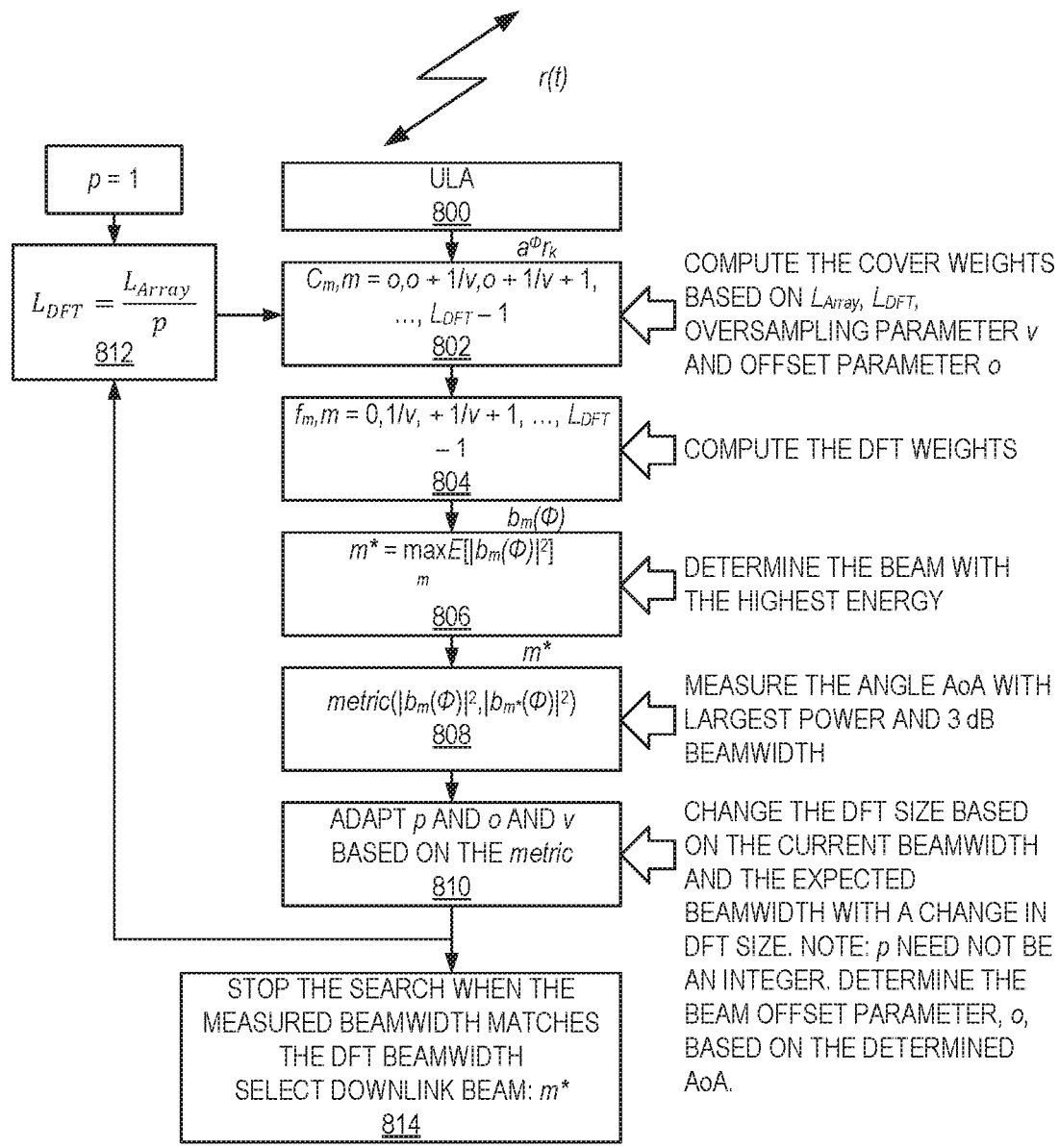
FIG. 8 illustrates one example of a procedure for computing the optimal (best) spatial orthonormal function based on a required 3 decibel (dB) beamwidth and Angle of Departure (AoD)

FIG. 8 illustrates one example of a procedure for computing the optimal (best) spatial orthonormal function $\mathfrak{f}_{M\times N\times 2}^{opt,subBand}$ based on the required 3 dB beamwidth and AoD. In particular, this procedure obtains the optimal spatial orthonormal function $\mathfrak{f}_{M\times N\times 2}^{opt,subBand}$ from $\mathfrak{f}_{M\times N\times 2}^{o}$ by applying a sampling offset "o" and a sampling periodicity "v" and the set of cover weights $C_m$.

As shown in Eqn. (24) and the associated text, the size of the ULA, $L_{Array}$, and the DFT size, $L_{DFT}$, define the beamwidth of the DFT beam. The "p" in FIG. 8, which is the scaling factor applied to $L_{DFT}$ to obtain $L_{Array}$, is initialized to 1 at the start of the procedure and then adapted to match the required 3 dB beamwidth. The sampling offset "o" and the sampling periodicity "v" are adapted to match the required AoD.

More specifically, as illustrated in FIG. 8, $\alpha^\Phi r_k$ is multiplied with the coefficients $C_m$ as explained in Eqns. (5.4-6) (step 800). Here we separate $r_k$ out of the equation because of the transmitted signal is known signal. Therefore the output of the third block (with f_m) is the b_m. For the first iteration, the sampling offset "o" is initialized to "0", the sampling periodicity "v" is initialized to "1", and the scaling factor "p" is initialized to 1. The cover weights $C_m(m)$ for $$m = o, o + \frac{1}{v}, o + \frac{1}{v} + 1, \ldots, L_{DFT} - 1$$

are computed based on $L_{Array}$, $L_{DFT}$, the sampling offset "o," and the sampling periodicity "v" (i.e., the oversampling parameter "v") in accordance with Eqn. (16) (step 802). Also, the elements $\mathfrak{f}_m(m)$ for $$m = 0, \frac{1}{v}, \frac{1}{v} + 1, \ldots, L_{DFT} - 1$$

are computed using Eqn. (17) (step 804). The beam $b_m\phi$ with the highest energy is determined (step 806). The index of the beam with the highest energy is denoted m*. A metric metric $(|b_m(\phi)|^2, |b_{m'}(\phi)|^2)$ is computed (step 808). The metric is a measurement of the Angle of Arrival (AoA) with the largest power and 3 dB beamwidth. For example, the function metric $(|b_m(\phi)|^2, |b_{m'}(\phi)|^2)$ can interpolate the powers of the beams centered around the beam with the highest received power, i.e., beam m* with power $|b_{m'}(\phi)|^2$. The interpolation function can be for example, of the form $$\left|\frac{\sin(n\phi)}{\sin(\phi)}\right|^2$$

similar shape as Eqn. (24). The angle which results in the maximum power after interpolation is considered as the most probable AoA. Similarly, a measure of 3 dB beamwidth can also be obtained by evaluating the interpolated function for −1.5 dB points on either side of AoA angle with respect to the maximum received power. If the 3 dB beamwidth and AoA of beam m* does not match the required 3 dB beamwidth and the required AoD, then the sampling offset "o," the sampling periodicity "v," and the scaling factor "p" are adapted (e.g., incremented) based on the metric (step 810), a new $L_{DFT}$ is computed based on the new value of "p" (step 812), and the process returns to step 802. Once the 3 dB beamwidth and AoA of beam m* matches the required 3 dB beamwidth and the required AoD, the process stops and beam m* is selected as the desired beam (step 814). At this point, $f_{m^*}'$ has been computed. In the context of FIG. 6 and the associated text, $f_{m^*}'$ is the optimal spatial orthonormal function $f_{M \times N \times 2}^{opt, subBand}$.

The embodiments described thus far are reciprocity-based. In another embodiment, a codebook based approach is used. In other words, in this embodiment, a codebook defines multiple beams (e.g., DFT beams), and the wireless device 112 reports a preferred beam for, e.g., PDSCH by reporting an index or indices to that preferred beam(s) in the codebook. A predefined beam width for PDCCH transmission (to ensure extra robustness) together with the angle associated with the reported beam enables the base station 102 to transmit PDCCH (or any other control message requiring high level of robustness) still with some degree of beam forming. This broader beam could be one of the beams derived in (24).

Figure 9:
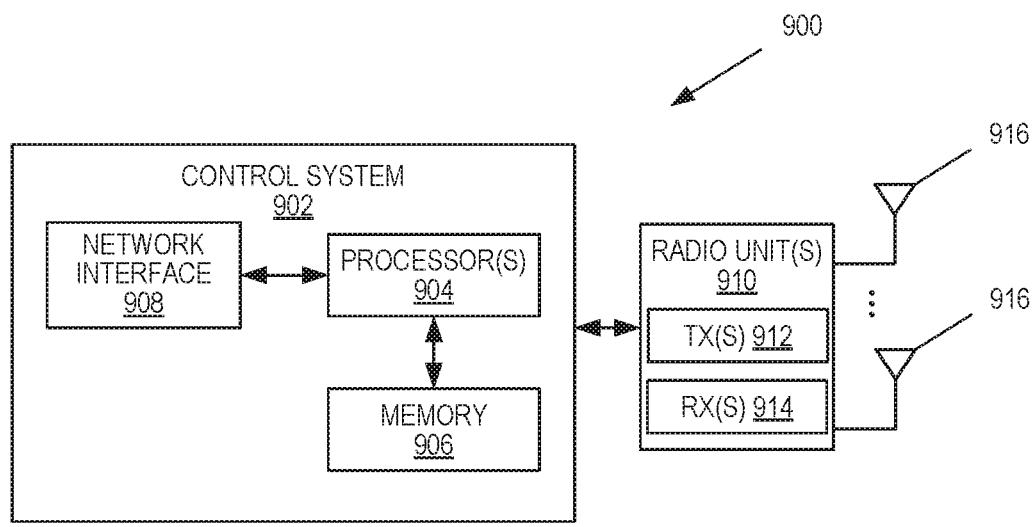
FIG. 9 is a schematic block diagram of a radio access node according to some embodiments of the present disclosure.

FIG. 9 is a schematic block diagram of a radio access node 900 according to some embodiments of the present disclosure. The radio access node 900 may be, for example, a base station 102 or 106. As illustrated, the radio access node 900 includes a control system 902 that includes one or more processors 904 (e.g., Central Processing Units (CPUs), Application Specific Integrated Circuits (ASICs), Field Programmable Gate Arrays (FPGAs), and/or the like), memory 906, and a network interface 908. In addition, the radio access node 900 includes one or more radio units 910 that each includes one or more transmitters 912 and one or more receivers 914 coupled to one or more antennas 916. In some embodiments, the radio unit(s) 910 is external to the control system 902 and connected to the control system 902 via, e.g., a wired connection (e.g., an optical cable). However, in some other embodiments, the radio unit(s) 910 and potentially the antenna(s) 916 are integrated together with the control system 902. The one or more processors 904 operate to provide one or more functions of a radio access node 900 as described herein. In some embodiments, the function(s) are implemented in software that is stored, e.g., in the memory 906 and executed by the one or more processors 904.

Figure 10:
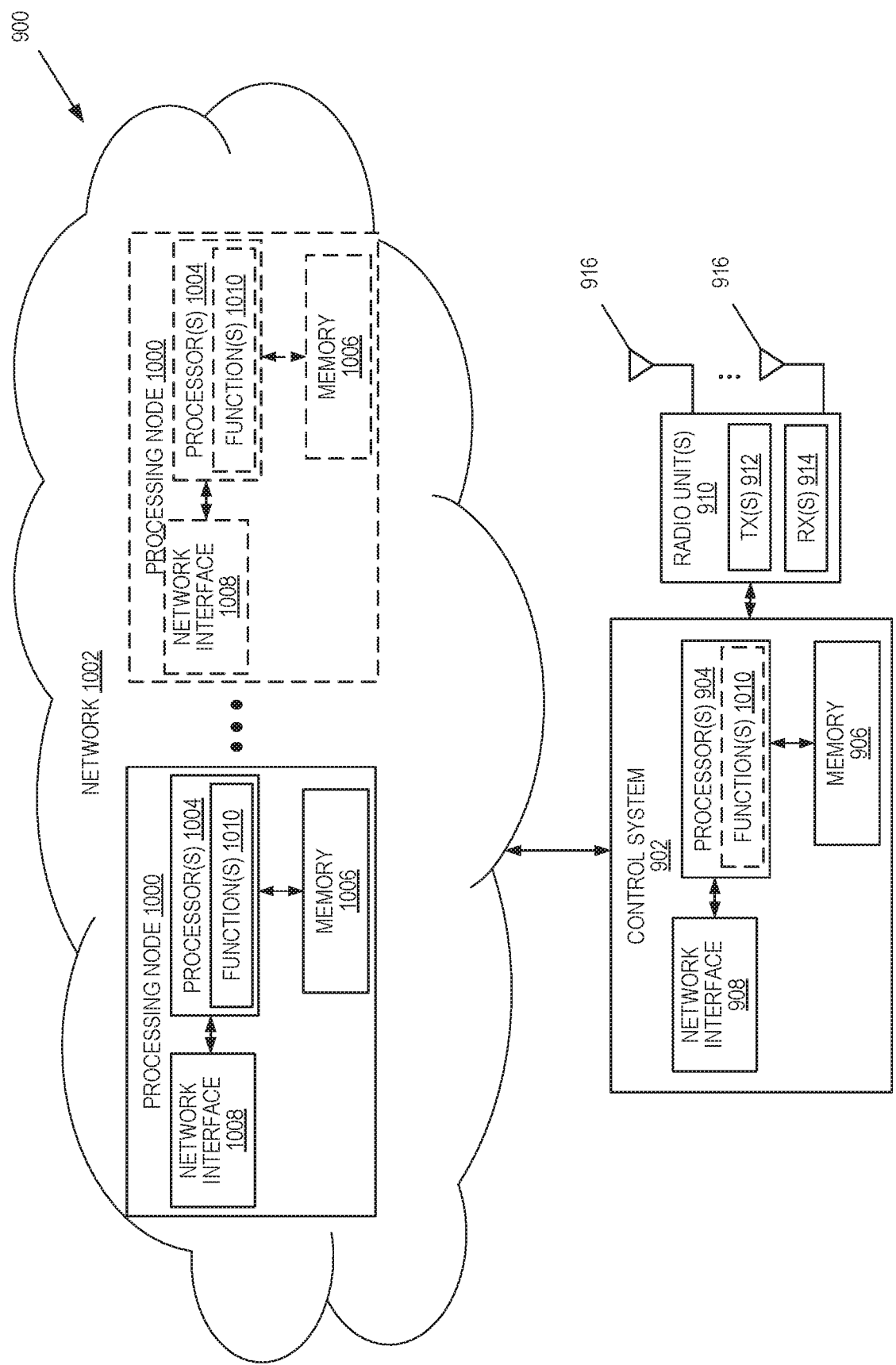
FIG. 10 is a schematic block diagram that illustrates a virtualized embodiment of the radio access node of FIG. 9 according to some embodiments of the present disclosure.

FIG. 10 is a schematic block diagram that illustrates a virtualized embodiment of the radio access node 900 according to some embodiments of the present disclosure. This discussion is equally applicable to other types of network nodes. Further, other types of network nodes may have similar virtualized architectures.

As used herein, a "virtualized" radio access node is an implementation of the radio access node 900 in which at least a portion of the functionality of the radio access node 900 is implemented as a virtual component(s) (e.g., via a virtual machine(s) executing on a physical processing node(s) in a network(s)). As illustrated, in this example, the radio access node 900 includes the control system 902 that includes the one or more processors 904 (e.g., CPUs, ASICs, FPGAs, and/or the like), the memory 906, and the network interface 908 and the one or more radio units 910 that each includes the one or more transmitters 912 and the one or more receivers 914 coupled to the one or more antennas 916, as described above. The control system 902 is connected to the radio unit(s) 910 via, for example, an optical cable or the like. The control system 902 is connected to one or more processing nodes 1000 coupled to or included as part of a network(s) 1002 via the network interface 908. Each processing node 1000 includes one or more processors 1004 (e.g., CPUs, ASICs, FPGAs, and/or the like), memory 1006, and a network interface 1008.

In this example, functions 1010 of the radio access node 900 described herein are implemented at the one or more processing nodes 1000 or distributed across the control system 902 and the one or more processing nodes 1000 in any desired manner. In some particular embodiments, some or all of the functions 1010 of the radio access node 900 described herein are implemented as virtual components executed by one or more virtual machines implemented in a virtual environment(s) hosted by the processing node(s) 1000. As will be appreciated by one of ordinary skill in the art, additional signaling or communication between the processing node(s) 1000 and the control system 902 is used in order to carry out at least some of the desired functions 1010. Notably, in some embodiments, the control system 902 may not be included, in which case the radio unit(s) 910 communicate directly with the processing node(s) 1000 via an appropriate network interface(s).

In some embodiments, a computer program including instructions which, when executed by at least one processor, causes the at least one processor to carry out the functionality of radio access node 900 or a node (e.g., a processing node 1000) implementing one or more of the functions 1010 of the radio access node 900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
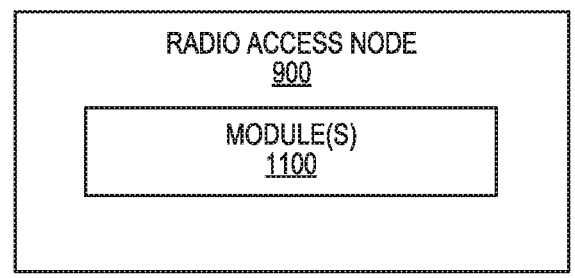
FIG. 11 is a schematic block diagram of the radio access node of FIG. 9 according to some other embodiments of the present disclosure.

FIG. 11 is a schematic block diagram of the radio access node 900 according to some other embodiments of the present disclosure. The radio access node 900 includes one or more modules 1100, each of which is implemented in software. The module(s) 1100 provide the functionality of the radio access node 900 described herein. This discussion is equally applicable to the processing node 1000 of FIG. 10 where the modules 1100 may be implemented at one of the processing nodes 1000 or distributed across multiple processing nodes 1000 and/or distributed across the processing node(s) 1000 and the control system 902.

Figure 12:
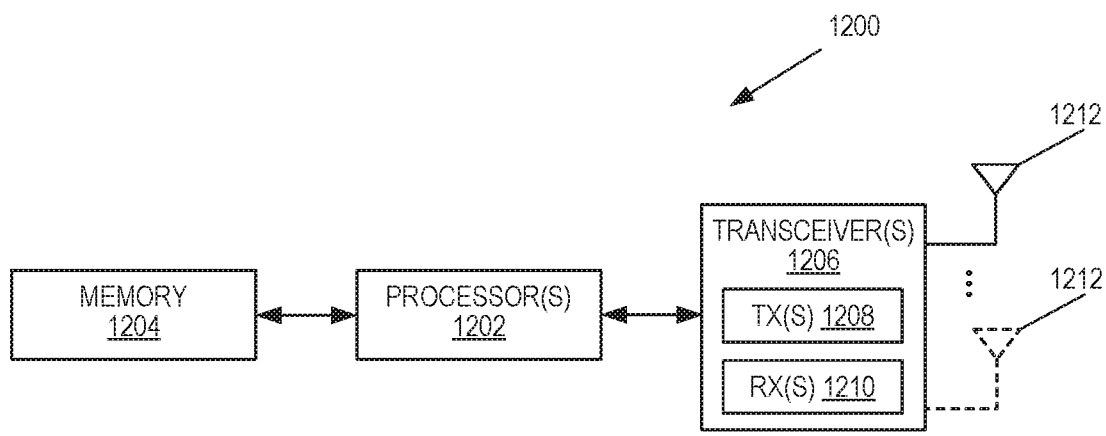
FIG. 12 is a schematic block diagram of a User Equipment device (UE) according to some embodiments of the present disclosure.

FIG. 12 is a schematic block diagram of a UE 1200 according to some embodiments of the present disclosure. As illustrated, the UE 1200 includes one or more processors 1202 (e.g., CPUs, ASICs, FPGAs, and/or the like), memory 1204, and one or more transceivers 1206 each including one or more transmitters 1208 and one or more receivers 1210 coupled to one or more antennas 1212. In some embodiments, the functionality of the UE 1200 described above may be fully or partially implemented in software that is, e.g., stored in the memory 1204 and executed by the processor(s) 1202.

In some embodiments, a computer program including instructions which, when executed by at least one processor, causes the at least one processor to carry out the functionality of the UE 1200 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
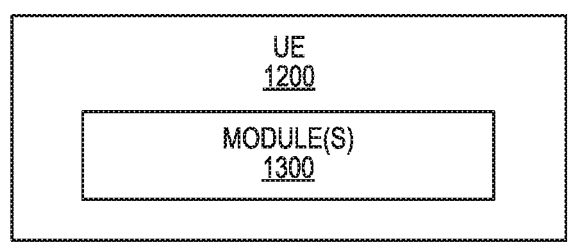
FIG. 13 is a schematic block diagram of the UE of FIG. 12 according to some other embodiments of the present disclosure.

FIG. 13 is a schematic block diagram of the UE 1200 according to some other embodiments of the present disclosure. The UE 1200 includes one or more modules 1300, each of which is implemented in software. The module(s) 1300 provide the functionality of the UE 1200 described herein.

Figure 14:
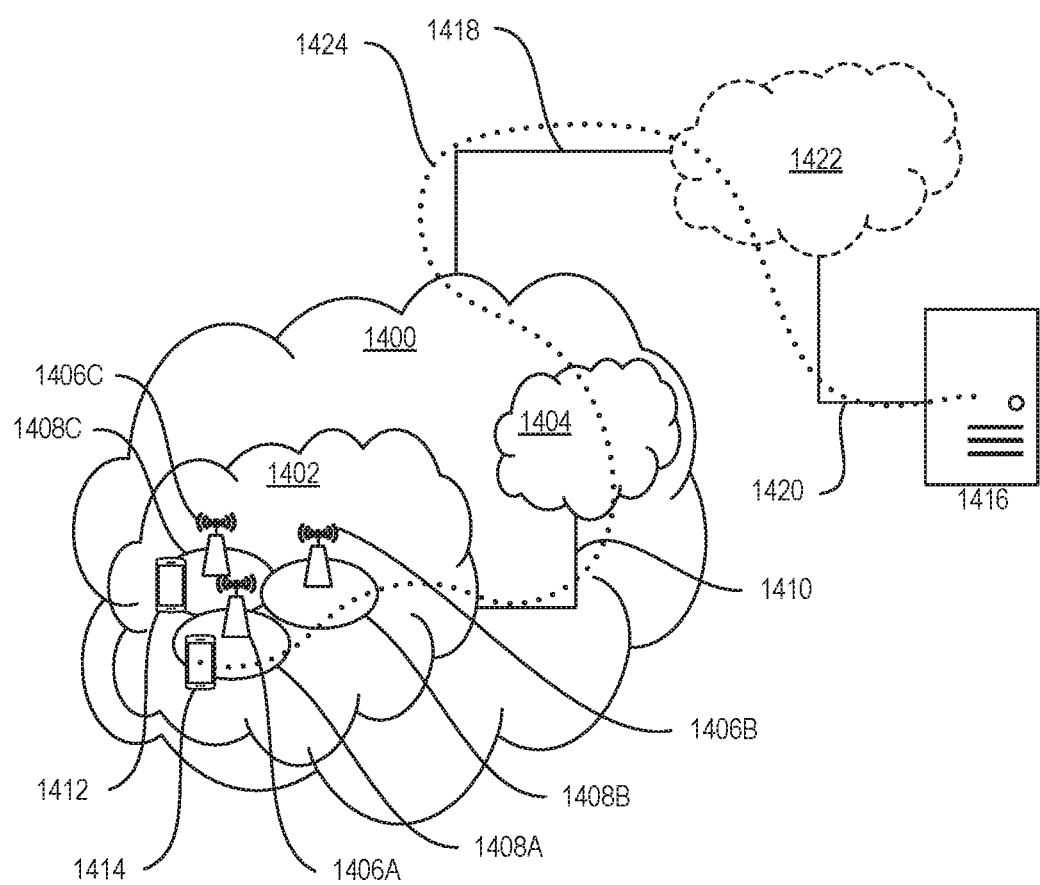
FIG. 14 illustrates a telecommunication network connected via an intermediate network to a host computer in accordance with some embodiments of the present disclosure.

With reference to FIG. 14, in accordance with an embodiment, a communication system includes a telecommunication network 1400, such as a 3GPP-type cellular network, which comprises an access network 1402, such as a RAN, and a core network 1404. The access network 1402 comprises a plurality of base stations 1406A, 1406B, 1406C, such as NBs, eNBs, gNBs, or other types of wireless Access Points (APs), each defining a corresponding coverage area 1408A, 1408B, 1408C. Each base station 1406A, 1406B, 1406C is connectable to the core network 1404 over a wired or wireless connection 1410. A first UE 1412 located in coverage area 1408C is configured to wirelessly connect to, or be paged by, the corresponding base station 1406C. A second UE 1414 in coverage area 1408A is wirelessly connectable to the corresponding base station 1406A. While a plurality of UEs 1412, 1414 are illustrated in this example, the disclosed embodiments are equally applicable to a situation where a sole UE is in the coverage area or where a sole UE is connecting to the corresponding base station 1406.

The telecommunication network 1400 is itself connected to a host computer 1416, which may be embodied in the hardware and/or software of a standalone server, a cloud-implemented server, a distributed server, or as processing resources in a server farm. The host computer 1416 may be under the ownership or control of a service provider, or may be operated by the service provider or on behalf of the service provider. Connections 1418 and 1420 between the telecommunication network 1400 and the host computer 1416 may extend directly from the core network 1404 to the host computer 1416 or may go via an optional intermediate network 1422. The intermediate network 1422 may be one of, or a combination of more than one of, a public, private, or hosted network; the intermediate network 1422, if any, may be a backbone network or the Internet; in particular, the intermediate network 1422 may comprise two or more sub-networks (not shown).

The communication system of FIG. 14 as a whole enables connectivity between the connected UEs 1412, 1414 and the host computer 1416. The connectivity may be described as an Over-the-Top (OTT) connection 1424. The host computer 1416 and the connected UEs 1412, 1414 are configured to communicate data and/or signaling via the OTT connection 1424, using the access network 1402, the core network 1404, any intermediate network 1422, and possible further infrastructure (not shown) as intermediaries. The OTT connection 1424 may be transparent in the sense that the participating communication devices through which the OTT connection 1424 passes are unaware of routing of uplink and downlink communications. For example, the base station 1406 may not or need not be informed about the past routing of an incoming downlink communication with data originating from the host computer 1416 to be forwarded (e.g., handed over) to a connected UE 1412. Similarly, the base station 1406 need not be aware of the future routing of an outgoing uplink communication originating from the UE 1412 towards the host computer 1416.

Example implementations, in accordance with an embodiment, of the UE, base station, and host computer discussed in the preceding paragraphs will now be described with reference to FIG. 15. In a communication system 1500, a host computer 1502 comprises hardware 1504 including a communication interface 1506 configured to set up and maintain a wired or wireless connection with an interface of a different communication device of the communication system 1500. The host computer 1502 further comprises processing circuitry 1508, which may have storage and/or processing capabilities. In particular, the processing circuitry 1508 may comprise one or more programmable processors, ASICs, FPGAs, or combinations of these (not shown) adapted to execute instructions. The host computer 1502 further comprises software 1510, which is stored in or accessible by the host computer 1502 and executable by the processing circuitry 1508. The software 1510 includes a host application 1512. The host application 1512 may be operable to provide a service to a remote user, such as a UE 1514 connecting via an OTT connection 1516 terminating at the UE 1514 and the host computer 1502. In providing the service to the remote user, the host application 1512 may provide user data which is transmitted using the OTT connection 1516.

The communication system 1500 further includes a base station 1518 provided in a telecommunication system and comprising hardware 1520 enabling it to communicate with the host computer 1502 and with the UE 1514. The hardware 1520 may include a communication interface 1522 for setting up and maintaining a wired or wireless connection with an interface of a different communication device of the communication system 1500, as well as a radio interface 1524 for setting up and maintaining at least a wireless connection 1526 with the UE 1514 located in a coverage area (not shown in FIG. 15) served by the base station 1518. The communication interface 1522 may be configured to facilitate a connection 1528 to the host computer 1502. The connection 1528 may be direct or it may pass through a core network (not shown in FIG. 15) of the telecommunication system and/or through one or more intermediate networks outside the telecommunication system. In the embodiment shown, the hardware 1520 of the base station 1518 further includes processing circuitry 1530, which may comprise one or more programmable processors, ASICs, FPGAs, or combinations of these (not shown) adapted to execute instructions. The base station 1518 further has software 1532 stored internally or accessible via an external connection.

The communication system 1500 further includes the UE 1514 already referred to. The UE's 1514 hardware 1534 may include a radio interface 1536 configured to set up and maintain a wireless connection 1526 with a base station serving a coverage area in which the UE 1514 is currently located. The hardware 1534 of the UE 1514 further includes processing circuitry 1538, which may comprise one or more programmable processors, ASICs, FPGAs, or combinations of these (not shown) adapted to execute instructions. The UE 1514 further comprises software 1540, which is stored in or accessible by the UE 1514 and executable by the processing circuitry 1538. The software 1540 includes a client application 1542. The client application 1542 may be operable to provide a service to a human or non-human user via the UE 1514, with the support of the host computer 1502. In the host computer 1502, the executing host application 1512 may communicate with the executing client application 1542 via the OTT connection 1516 terminating at the UE 1514 and the host computer 1502. In providing the service to the user, the client application 1542 may receive request data from the host application 1512 and provide user data in response to the request data. The OTT connection 1516 may transfer both the request data and the user data. The client application 1542 may interact with the user to generate the user data that it provides.

Figure 15:
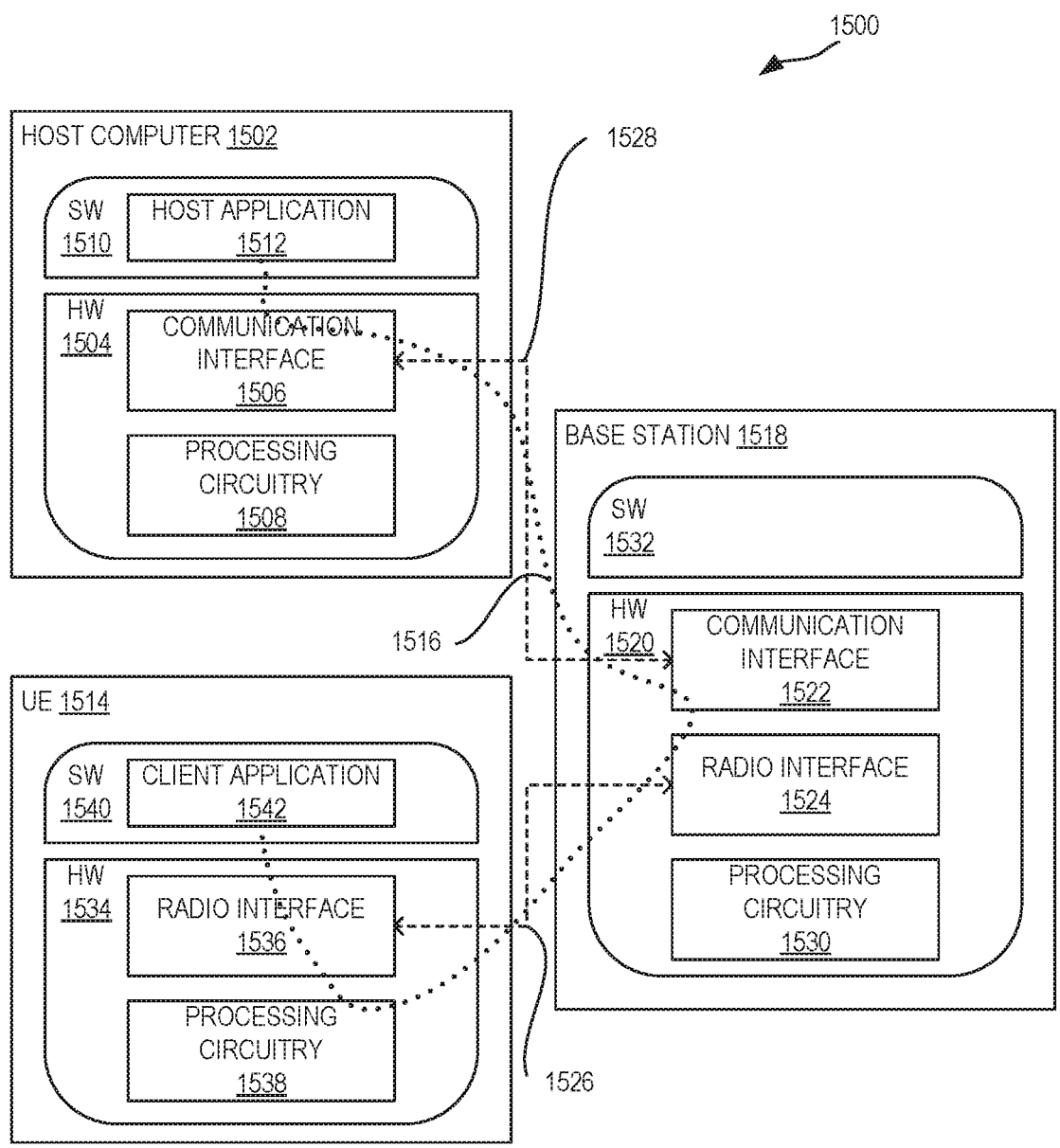
FIG. 15 is a generalized block diagram of a host computer communicating via a base station with a UE over a partially wireless connection in accordance with some embodiments of the present disclosure.

It is noted that the host computer 1502, the base station 1518, and the UE 1514 illustrated in FIG. 15 may be similar or identical to the host computer 1416, one of the base stations 1406A, 1406B, 1406C, and one of the UEs 1412, 1414 of FIG. 14, respectively. This is to say, the inner workings of these entities may be as shown in FIG. 15 and independently, the surrounding network topology may be that of FIG. 14.

In FIG. 15, the OTT connection 1516 has been drawn abstractly to illustrate the communication between the host computer 1502 and the UE 1514 via the base station 1518 without explicit reference to any intermediary devices and the precise routing of messages via these devices. The network infrastructure may determine the routing, which may be configured to hide from the UE 1514 or from the service provider operating the host computer 1502, or both. While the OTT connection 1516 is active, the network infrastructure may further take decisions by which it dynamically changes the routing (e.g., on the basis of load balancing consideration or reconfiguration of the network).

The wireless connection 1526 between the UE 1514 and the base station 1518 is in accordance with the teachings of the embodiments described throughout this disclosure. One or more of the various embodiments improve the performance of OTT services provided to the UE 1514 using the OTT connection 1516, in which the wireless connection 1526 forms the last segment. More precisely, the teachings of these embodiments may improve, e.g., data rate, latency, and/or power consumption and thereby provide benefits such as, e.g., reduced user waiting time, relaxed restriction on file size, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 1516 between the host computer 1502 and the UE 1514, in response to variations in the measurement results. The measurement procedure and/or the network functionality for reconfiguring the OTT connection 1516 may be implemented in the software 1510 and the hardware 1504 of the host computer 1502 or in the software 1540 and the hardware 1534 of the UE 1514, or both. In some embodiments, sensors (not shown) may be deployed in or in association with communication devices through which the OTT connection 1516 passes; the sensors may participate in the measurement procedure by supplying values of the monitored quantities exemplified above, or supplying values of other physical quantities from which the software 1510, 1540 may compute or estimate the monitored quantities. The reconfiguring of the OTT connection 1516 may include message format, retransmission settings, preferred routing, etc.; the reconfiguring need not affect the base station 1514, and it may be unknown or imperceptible to the base station 1514. Such procedures and functionalities may be known and practiced in the art. In certain embodiments, measurements may involve proprietary UE signaling facilitating the host computer 1502's measurements of throughput, propagation times, latency, and the like. The measurements may be implemented in that the software 1510 and 1540 causes messages to be transmitted, in particular empty or 'dummy' messages, using the OTT connection 1516 while it monitors propagation times, errors, etc.

Figures 16, 17:
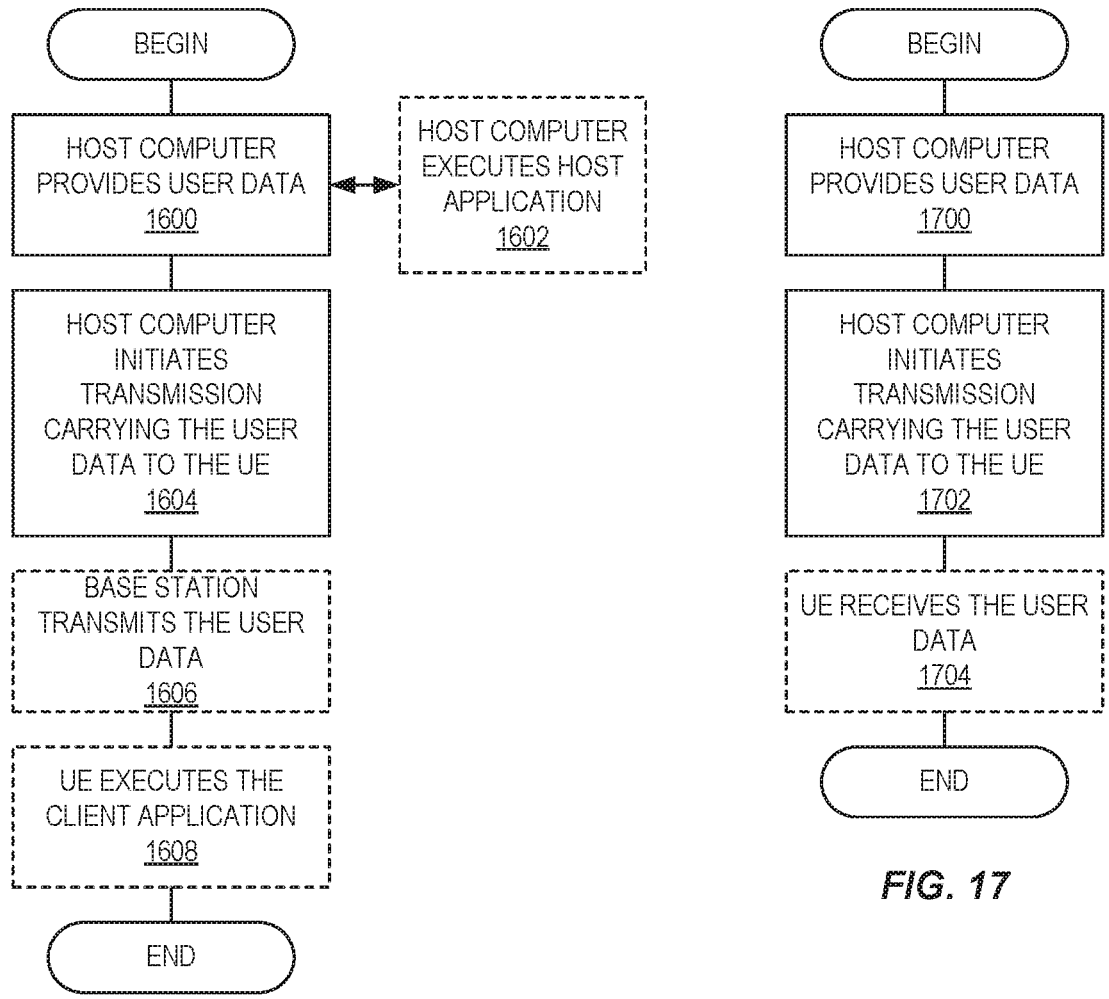
FIG. 16 is a flowchart illustrating a method implemented in a communication system in accordance with one embodiment of the present disclosure.
FIG. 17 is a flowchart illustrating a method implemented in a communication system in accordance with one embodiment of the present disclosure.

FIG. 16 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 16 will be included in this section. In step 1600, the host computer provides user data. In sub-step 1602 (which may be optional) of step 1600, the host computer provides the user data by executing a host application. In step 1604, the host computer initiates a transmission carrying the user data to the UE. In step 1606 (which may be optional), the base station transmits to the UE the user data which was carried in the transmission that the host computer initiated, in accordance with the teachings of the embodiments described throughout this disclosure. In step 1608 (which may also be optional), the UE executes a client application associated with the host application executed by the host computer.

FIG. 17 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 17 will be included in this section. In step 1700 of the method, the host computer provides user data. In an optional sub-step (not shown) the host computer provides the user data by executing a host application. In step 1702, the host computer initiates a transmission carrying the user data to the UE. The transmission may pass via the base station, in accordance with the teachings of the embodiments described throughout this disclosure. In step 1704 (which may be optional), the UE receives the user data carried in the transmission.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

2D Two Dimensional
3GPP Third Generation Partnership Project
5G Fifth Generation
AAS Antenna Array System
AoA Angle of Arrival AoD Angle of Departure
ASIC Application Specific Integrated Circuit
BF Beamforming
BLER Block Error Rate
BW Beamwidth
CPU Central Processing Unit
CSI Channel State Information
dB Decibel
DCI Downlink Control Information
DFT Discrete Fourier Transform
DSP Digital Signal Processor
eNB Enhanced or Evolved Node B
FIR Finite Impulse Response
FPGA Field Programmable Gate Array
gNB New Radio Base Station
ICC Information Carrying Capacity
IIR Infinite Impulse Response
LTE Long Term Evolution
MIMO Multiple Input Multiple Output
MME Mobility Management Entity
MMSE Minimum Mean Square Error
MTC Machine Type Communication
NR New Radio
OTT Over-the-Top
PBCH Physical Broadcast Channel
PDCCH Physical Downlink Control Channel
PDSCH Physical Downlink Shared Channel
P-GW Packet Data Network Gateway
RAM Random Access Memory
ROM Read Only Memory
RRC Radio Resource Control
RRH Remote Radio Head
SCEF Service Capability Exposure Function
SINR Signal to Interference plus Noise Ratio
TBS Transmission Block Size
UE User Equipment
ULA Uniform Linear Array
URA Uniform Rectangular Array Those skilled in the art will recognize improvements and modifications to the embodiments of the present disclosure. All such improvements and modifications are considered within the scope of the concepts disclosed herein.

What is claimed is:

1. A method implemented in a base station for precoding a downlink transmission, comprising:
    obtaining, for a time instant k, an estimate of a channel matrix for a wireless channel for a downlink from the base station to a wireless device;
    projecting the estimate of the channel matrix for the time instant k onto one or more sets of spatial orthonormal functions, thereby obtaining, for each set of spatial orthonormal functions, a set of coefficients $\{\alpha_{i,j,p},$ for i=0, 1, ..., N−1, j=0,1, ..., M−1, and p=0, P$\}$ that result from projecting the estimate of the channel matrix for the time instant k onto the set of spatial orthonormal functions, wherein M×N defines a number of subarrays in an antenna system of the base station arranged in N rows and M columns where each subarray consists of P polarizations;
    for each set of spatial orthonormal functions, filtering the set of coefficients for the set of spatial orthonormal functions for the time instant k and one or more additional sets of coefficients for the set of spatial orthonormal functions based on a filtering parameter that is specific to a downlink channel to be transmitted on the downlink from the base station to the wireless device, thereby providing a respective filtered set of coefficients $\{\overline{\alpha}_{i,j,p}\}$ for the set of spatial orthonormal functions for the time instant k;
    generating beamforming weights for the downlink channel to be transmitted on the downlink from the base station to the wireless device using the filtered set of coefficients $\{\overline{\alpha}_{i,j,p}\}$ for the time instant k for at least one of the one or more sets of spatial orthonormal functions; and
    precoding the downlink channel using the beamforming weights.

2. The method of claim 1 wherein filtering the set of coefficients for the set of spatial orthonormal functions for the time instant k comprises filtering the set of coefficients for the set of spatial orthonormal functions for the time instant k in the time domain, wherein the one or more additional sets of coefficients for the set of spatial orthonormal functions comprises one or more additional sets of coefficients for the set of spatial orthonormal functions for one or more previous time instants.

3. The method of claim 1 wherein:
    the estimate of the channel matrix is an estimate of the channel matrix at the time instant k for one of two or more subbands of a downlink frequency band; and
    filtering the set of coefficients for the set of spatial orthonormal functions for the time instant k comprises filtering the set of coefficients for the set of spatial orthonormal functions for the time instant k in the time domain and the frequency domain, wherein the one or more additional sets of coefficients for the set of spatial orthonormal functions comprises:
        one or more additional sets of coefficients for the set of spatial orthonormal functions for one or more previous time instants for the one of the two or more subbands; and
        for each of at least one additional subband of the two or more subbands, additional sets of coefficients for the set of spatial orthonormal functions for the additional subband for the time instant k and the one or more previous time instants.

4. The method of claim 1 further comprising:
    for each set of spatial orthonormal functions, filtering the set of coefficients for the set of spatial orthonormal functions and the one or more additional sets of coefficients for the set of spatial orthonormal functions based on a second filtering parameter that is specific to a second downlink channel to be transmitted on the downlink from the base station to the wireless device, thereby providing a respective second filtered set of coefficients for the set of spatial orthonormal functions for the time instant k;
    generating second beamforming weights for the second downlink channel to be transmitted on the downlink from the base station to the wireless device using the second filtered set of coefficients $\{\overline{\alpha}_{i,j,p}\}$ for the time instant k for at least one of the one or more sets of spatial orthonormal functions; and
    precoding the second downlink channel using the second beamforming weights.

5. The method of claim 4 wherein the downlink channel is a data channel and the second downlink channel is a control channel.

6. The method of claim 4 wherein the downlink channel is a physical downlink shared channel and the second downlink channel is a physical downlink control channel.

7. The method of claim 1 wherein:
    projecting the estimate of the channel matrix onto the one or more sets of spatial orthonormal functions comprises projecting the estimate of the channel matrix onto a set of spatial orthonormal functions; and generating the beamforming weights for the downlink channel to be transmitted on the downlink from the base station to the wireless device comprises:
 reconstructing a channel matrix for the wireless channel from the filtered set of coefficients $\{\overline{\alpha}_{i,j,p}\}$ for the set of spatial orthonormal functions; and
 computing the beamforming weights for the downlink channel from the reconstructed channel matrix.

8. The method of claim 1 wherein:
projecting the estimate of the channel matrix onto the one or more sets of spatial orthonormal functions comprises projecting the estimate of the channel matrix onto two or more sets of spatial orthonormal functions; and generating the beamforming weights for the downlink channel to be transmitted on the downlink from the base station to the wireless device comprises:
 selecting one of the two or more sets of spatial orthonormal functions based on the filtered sets of coefficients for the two or more sets of spatial orthonormal functions; wherein different ones of the two or more sets of spatial orthonormal functions having different 3 decibel, dB, beamwidths and/or different angles of departure with respect to the antenna system of the base station;
 selecting (one of the spatial orthonormal functions from the selected set of spatial orthonormal functions based on the filtered set of coefficients for the selected set of spatial orthonormal functions; and
 computing the beamforming weights for the downlink channel based on the selected spatial orthonormal function.

9. The method of claim 8 wherein selecting one of the two or more sets of spatial orthonormal functions based on the filtered sets of coefficients for the two or more sets of spatial orthonormal functions comprises:
 selecting one of the two or more sets of spatial orthonormal functions that is determined, based on the respective filtered set of coefficients, to satisfy one or more conditions, the one or more conditions comprising at least one of the following conditions:
  a condition where a number of orthonormal functions or beams within the one set defined by the filtered set of coefficients that contains useful information is less than a predefined threshold number of beams;
  a condition where a signal to leakage ratio is greater than a predefined threshold signal to leakage ratio, where the signal to leakage ratio is defined as a ratio of useful signal power captured by the set of coefficients of the one set of orthonormal functions to signal power that is not captured by the set of coefficients of the one set of orthonormal functions; and
  a condition that a maximum radiated power in the number of orthonormal functions or beams other than one or more orthonormal functions or beams that contain useful information is less than a predefined threshold radiated power.

10. The method of claim 8 wherein selecting one of the spatial orthonormal functions from the selected set of spatial orthonormal functions based on the filtered set of coefficients for the selected sets of spatial orthonormal functions comprises:
 selecting one of the spatial orthonormal functions from the selected set of spatial orthonormal functions having a largest value of $|\overline{\alpha}_{i,j,p}|$ within the selected set of spatial orthonormal functions.

11. The method of claim 8 wherein computing the beamforming weights for the downlink channel based on the selected spatial orthonormal function comprises scaling the selected spatial orthonormal function in the selected set of spatial orthonormal functions based on a scaling factor, the scaling factor being such that a total transmit power is within predefined limits of an allowed transmit power range for the base station.

12. The method of claim 1 wherein:
projecting the estimate of the channel matrix onto the one or more sets of spatial orthonormal functions comprises projecting the estimate of the channel matrix onto a set of spatial orthonormal functions that defines a set of beams having a smallest 3 decibel, dB, beamwidth among all transmit beams on which the base station can transmit; and generating the beamforming weights for the downlink channel to be transmitted on the downlink from the base station to the wireless device comprises:
 determining a required 3 dB beamwidth and a required angle of departure for transmission of the downlink channel to the wireless device based on the filtered set of coefficients for the set of spatial orthonormal functions;
 determining a spatial orthonormal function based on the required 3 dB beamwidth and the required angle of departure; and
 computing the beamforming weights for the downlink channel based on the determined spatial orthonormal function.

13. The method of claim 1 wherein:
projecting the estimate of the channel matrix onto the one or more sets of spatial orthonormal functions comprises projecting the estimate of the channel matrix onto one or more sets of spatial orthonormal functions; and generating the beamforming weights for the downlink channel to be transmitted on the downlink from the base station to the wireless device comprises:
 determining a required 3 decibel, dB, beamwidth and a required angle of departure for transmission of the downlink channel to the wireless device based on the filtered set of coefficients for the set of spatial orthonormal functions;
 determining a spatial orthonormal function based on the required 3 dB beamwidth and the required angle of departure; and
 computing the beamforming weights for the downlink channel based on the determined spatial orthonormal function;
wherein determining the required 3 dB beamwidth and the required angle of departure for transmission of the downlink channel to the wireless device based on the filtered set of coefficients for the set of spatial orthonormal functions comprises:
 determining the spatial orthonormal function with a largest coefficient;
 determining a required angle of departure by further finding a maximum gain angle for the selected orthonormal function; and
 determining the required 3 dB beamwidth by finding a difference of angles on either side of the maximum gain angle which represent 3 dB lower gain compared to the maximum gain.

14. The method of claim 13 wherein determining a spatial orthonormal function based on the required 3 dB beamwidth and the required angle of departure comprises comparing the determined 3 dB beamwidth with a required beamwidth and generating another orthonormal function with a required angle of departure and 3 dB beamwidth.

15. The method of claim 14 wherein generating the other orthonormal function is iteratively evaluated until a desired angle of departure accuracy is achieved.

16. The method of claim 14 wherein the required 3 dB beamwidth is determined as a time variation of estimated angle of departure.

17. The method of claim 12 wherein computing the beamforming weights for the downlink channel based on the determined spatial orthonormal function comprises scaling the determined spatial orthonormal function based on a scaling factor, the scaling factor being such that a total transmit power is within predefined limits of an allowed transmit power range for the base station.

18. A method implemented in a communication system including a host computer, a base station, and a wireless device, the method comprising:
at the host computer, providing user data; and
at the host computer, initiating a transmission carrying the user data to the wireless device via a cellular network comprising the base station, wherein the base station:
obtains, for a time instant k, an estimate of a channel matrix for a wireless channel for a downlink from the base station to the wireless device;
projects the estimate of the channel matrix for the time instant k onto one or more sets of spatial orthonormal functions, thereby obtaining, for each set of spatial orthonormal functions, a set of coefficients $\{\alpha_{i,j,p},$ for $i=0, 1, \ldots, N-1, j=0,1, \ldots, M-1,$ and $p=0, \ldots, P\}$ that result from projecting the estimate of the channel matrix for the time instant k onto the set of spatial orthonormal functions, wherein M×N defines a number of subarrays in an antenna system of the base station arranged in N rows and M columns where each subarray consists of P polarizations;
for each set of spatial orthonormal functions, filters the set of coefficients for the set of spatial orthonormal functions for the time instant k and one or more additional sets of coefficients for the set of spatial orthonormal functions based on a filtering parameter that is specific to a downlink channel to be transmitted on the downlink from the base station to the wireless device, thereby providing a respective filtered set of coefficients $\{\overline{\alpha}_{i,j,p}\}$ for the set of spatial orthonormal functions for the time instant k;
generates beamforming weights for the downlink channel to be transmitted on the downlink from the base station to the wireless device using the filtered set of coefficients $\{\overline{\alpha}_{i,j,p}\}$ for the time instant k for at least one of the one or more sets of spatial orthonormal functions; and
precodes the downlink channel using the beamforming weights.

19. A base station configured to communicate with a wireless device, the base station comprising:
one or more radio units; and
processing circuitry configured to:
obtain, for the time instant k, an estimate of a channel matrix for a wireless channel for a downlink from the base station to the wireless device;
project the estimate of the channel matrix for the time instant k onto one or more sets of spatial orthonormal functions, thereby obtaining, for each set of spatial orthonormal functions, a set of coefficients $\{\alpha_{i,j,p},$ for $i=0, 1, \ldots, N-1, j=0,1, \ldots, M-1,$ and $p=0, P\}$ that result from projecting the estimate of the channel matrix for the time instant k onto the set of spatial orthonormal functions, wherein M×N defines a number of subarrays in an antenna system of the base station arranged in N rows and M columns where each subarray consists of P polarizations;
for each set of spatial orthonormal functions, filter the set of coefficients for the set of spatial orthonormal functions for the time instant k and one or more additional sets of coefficients for the set of spatial orthonormal functions based on a filtering parameter that is specific to a downlink channel to be transmitted on the downlink from the base station to the wireless device, thereby providing a respective filtered set of coefficients $\{\overline{\alpha}_{i,j,p}\}$ for the set of spatial orthonormal functions for the time instant k;
generate beamforming weights for the downlink channel to be transmitted on the downlink from the base station to the wireless device using the filtered set of coefficients $\{\overline{\alpha}_{i,j,p}\}$ for the time instant k for at least one of the one or more sets of spatial orthonormal functions; and
precode the downlink channel using the beamforming weights.

20. A communication system including a host computer comprising:
processing circuitry configured to provide user data; and
a communication interface configured to forward the user data to a cellular network for transmission to a wireless device,
wherein the cellular network comprises a base station having a radio interface and processing circuitry, the base station's processing circuitry configured to:
obtain, for a time instant k, an estimate of a channel matrix for a wireless channel for a downlink from the base station to the wireless device;
project the estimate of the channel matrix for the time instant k onto one or more sets of spatial orthonormal functions, thereby obtaining, for each set of spatial orthonormal functions, a set of coefficients $\{\alpha_{i,j,p},$ for $i=0, 1, \ldots, N-1, j=0,1, \ldots, M-1,$ and $p=0, P\}$ that result from projecting the estimate of the channel matrix for the time instant k onto the set of spatial orthonormal functions, wherein M×N defines a number of subarrays in an antenna system of the base station arranged in N rows and M columns where each subarray consists of P polarizations;
for each set of spatial orthonormal functions, filter the set of coefficients for the set of spatial orthonormal functions for the time instant k and one or more additional sets of coefficients for the set of spatial orthonormal functions based on a filtering parameter that is specific to a downlink channel to be transmitted on the downlink from the base station to the wireless device, thereby providing a respective filtered set of coefficients $\{\overline{\alpha}_{i,j,p}\}$ for the set of spatial orthonormal functions for the time instant k;
generate beamforming weights for the downlink channel to be transmitted on the downlink from the base station to the wireless device using the filtered set of coefficients $\{\overline{\alpha}_{i,j,p}\}$ for the time instant k for at least one of the one or more sets of spatial orthonormal functions; and precode the downlink channel using the beamforming weights.

\* \* \* \* \*